(12) United States Patent
Melnik et al.

(10) Patent No.: US 11,151,083 B2
(45) Date of Patent: *Oct. 19, 2021

(54) GENERATING TARGET APPLICATION PACKAGES FOR GROUPS OF COMPUTING DEVICES

(71) Applicant: SPLUNK INC., San Francisco, CA (US)

(72) Inventors: Grigori Melnik, Redmond, WA (US); David Searle Noble, Redmond, WA (US); Itay Alfred Neeman, Seattle, WA (US); Cecelia Campbell, Bellevue, WA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,438

(22) Filed: Nov. 27, 2019

(65) Prior Publication Data

US 2020/0097447 A1 Mar. 26, 2020

Related U.S. Application Data

(63) Continuation of application No. 15/143,438, filed on Apr. 29, 2016, now Pat. No. 10,496,605.

(51) Int. Cl.
*G06F 8/60* (2018.01)
*G06F 16/16* (2019.01)

(52) U.S. Cl.
CPC ............. *G06F 16/16* (2019.01); *G06F 8/60* (2013.01)

(58) Field of Classification Search
CPC ... G06F 16/16; G06F 8/60; G06F 8/64; G06F 17/301; G06F 17/30115; G06F 17/30867
See application file for complete search history.

(56) References Cited

U.S. PATENT DOCUMENTS

| | | | |
|---|---|---|---|
| 6,687,735 B1* | 2/2004 | Logston | G06F 8/60 370/486 |
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |

(Continued)

OTHER PUBLICATIONS

Vaid, Workshop on Managing Systems via log Analysis and Machine Learning Techniques (SLAML '10), ;login: vol. 36, No. 1, Oct. 3, 2010, Vancouver, BC, Canada.

(Continued)

*Primary Examiner* — Wei Y Zhen
*Assistant Examiner* — Amir Soltanzadeh
(74) *Attorney, Agent, or Firm* — Knobbe, Martens, Olson & Bear, LLP

(57) ABSTRACT

An application development and deployment system allows an application developer to develop applications for a distributed data intake and query system. The application may include information that associates portions of the application with particular server groups of the distributed data intake and query system. The application may be partitioned to generate target application packages for each of the server groups of the data intake and query system.

30 Claims, 20 Drawing Sheets

(56) References Cited

U.S. PATENT DOCUMENTS

| | | | |
|---|---|---|---|
| 10,496,605 B2 | 12/2019 | Melnik et al. | |
| 2007/0282979 A1* | 12/2007 | Tuel | G06F 9/5033 709/219 |
| 2012/0131546 A1* | 5/2012 | Van Velzen | G06F 8/60 717/106 |
| 2013/0318536 A1* | 11/2013 | Fletcher | G06F 9/54 718/104 |
| 2014/0282469 A1* | 9/2014 | Johnson | G06F 8/65 717/170 |
| 2014/0298318 A1* | 10/2014 | Ahn | G06F 8/71 717/174 |
| 2014/0337816 A1* | 11/2014 | Chiluvuri | G06F 8/36 717/107 |
| 2015/0234653 A1* | 8/2015 | Fortune | G06F 8/71 717/121 |
| 2017/0068525 A1 | 3/2017 | Johnston et al. | |
| 2019/0098106 A1 | 3/2019 | Mungel et al. | |

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Carraso, David, "Exploring Splunk," published by CITO Research, New York, NY, Apr. 2012.

SLAML 10 Reports, Workshop on Managing Systems via Log Analysis and Machine Learning Techniques, ;login: Feb. 2011 Conference Reports.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

\* cited by examiner

GENERATING TARGET APPLICATION PACKAGES FOR GROUPS OF COMPUTING DEVICES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

An increasing number and variety of devices engage in communications via networks such as the internet. In addition to traditional computing devices such as computers, smart phones, and tablets, an increasing number of other machines and equipment are being deployed as connected devices. Wearables, the Internet of Things, the smart home, and myriad other devices utilize remote resources such as servers executing programs and cloud storage in order to provide additional functionality. As a result, a large volume of data such as user data and machine data is created and exchanged by connected devices and the equipment (e.g., servers and cloud storage) that serves those devices.

It is useful to store much of this large volume of data. Information such as user behaviors, program errors, and usage patterns may be analyzed to improve the functionality of a program or device. Information about the operation of hardware and software systems such as servers such as logs and statistics may be analyzed for numerous reasons, such as to identify usage patterns, update programs and equipment, troubleshoot failures, and improve system operations. A data intake and query system may provide a mechanism for large volumes of data to be stored for later searching and analysis. In order to manage and handle a large volume of data from a variety of sources, the system may employ a number of servers that perform different roles in the process of ingesting data, storing data, and performing searching and analysis of data.

The storage of large volumes of data within a data intake and query system and the ability to search such a system results in a rich source of information that can be used for a range of purposes. Developers may write software applications that run within the data intake and query system. However, data intake and query systems often have unique and complex implementations, such that it may be difficult to create applications that run on different systems, or that efficiently utilize the functionality of those systems. Administrators operating the data intake and query system may be forced to engage in painstaking configuration and installations in order to install and operate an application on the system. The difficulty of creating, deploying and configuring applications for a data intake and query system limits the availability of applications that may provide useful functionality for the data intake and query system.

DETAILED DESCRIPTION

Figure 1:
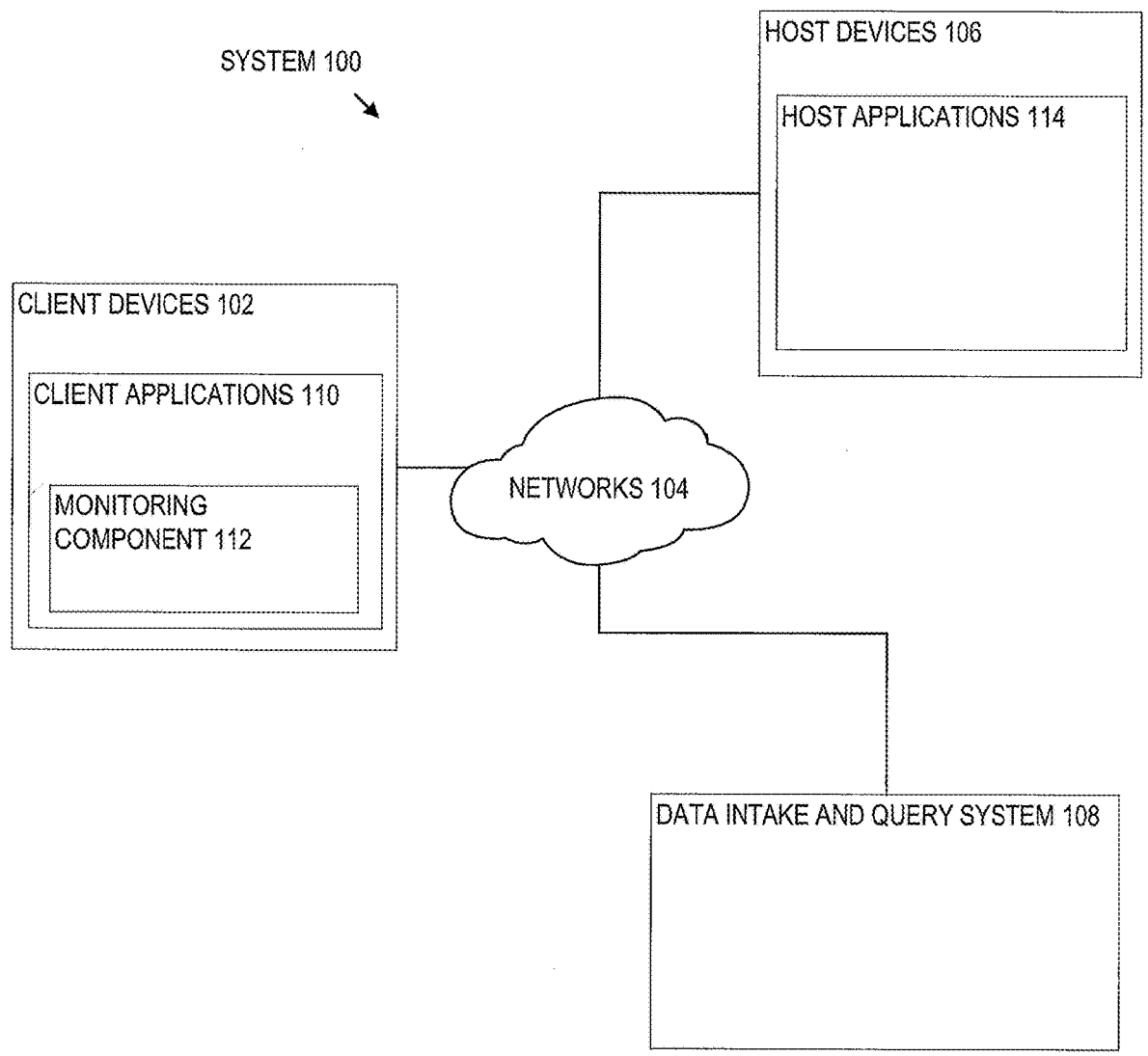
FIG. 1 illustrates a networked computer environment in which an embodiment may be implemented.

A computer-implemented method for deploying an application to a data intake and query system comprises receiving a source application package comprising code and a plurality of files and identifying a plurality of server groups of the data intake and query system, wherein a first server group receives data from a data source and forwards the received data to a second server group, wherein the second server group indexes the received data and stores the indexed data in a data store, and wherein a third server group searches the indexed data. The computer implemented method further comprises accessing one or more partitioning rules that associate each of the server groups with one or more of the plurality of files and one or more portions of the code and generating a target application package for each server group, wherein each target application package includes the one or more of the plurality of files and the one or more portions of code that are associated with the server group based on the partitioning rules.

A non-transitory computer-readable storage medium comprises instructions stored thereon, which when executed by one or more processors, cause the one or more processors to perform operations comprising receiving a source application package comprising code and a plurality of files and identifying a plurality of server groups of a data intake and query system, wherein a first server group receives data from a data source and forwards the received data to a second server group, wherein the second server group indexes the received data and stores the indexed data in a data store, and wherein a third server group searches the indexed data. The instructions further cause the one or more processors to perform operations comprising accessing one or more partitioning rules that associate each of the server groups with one or more of the plurality of files and one or more portions of the code and generating a target application package for each server group, wherein each target application package includes the one or more of the plurality of files and the one or more portions of code that are associated with the server group based on the partitioning rules.

A system for deploying an application to a data intake and query system comprises at least one memory having instructions stored thereon at least one processor configured to execute the instructions to receive a source application package comprising code and a plurality of files and identify a plurality of server groups of the data intake and query system, wherein a first server group receives data from a data source and forwards the received data to a second server group, wherein the second server group indexes the received data and stores the indexed data in a data store, and wherein a third server group searches the indexed data. The at least one processor is further configured to execute the instructions to access one or more partitioning rules that associate each of the server groups with one or more of the plurality of files and one or more portions of the code and generate a target application package for each server group, wherein each target application package includes the one or more of the plurality of files and the one or more portions of code that are associated with the server group based on the partitioning rules.

1.0. General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, a SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
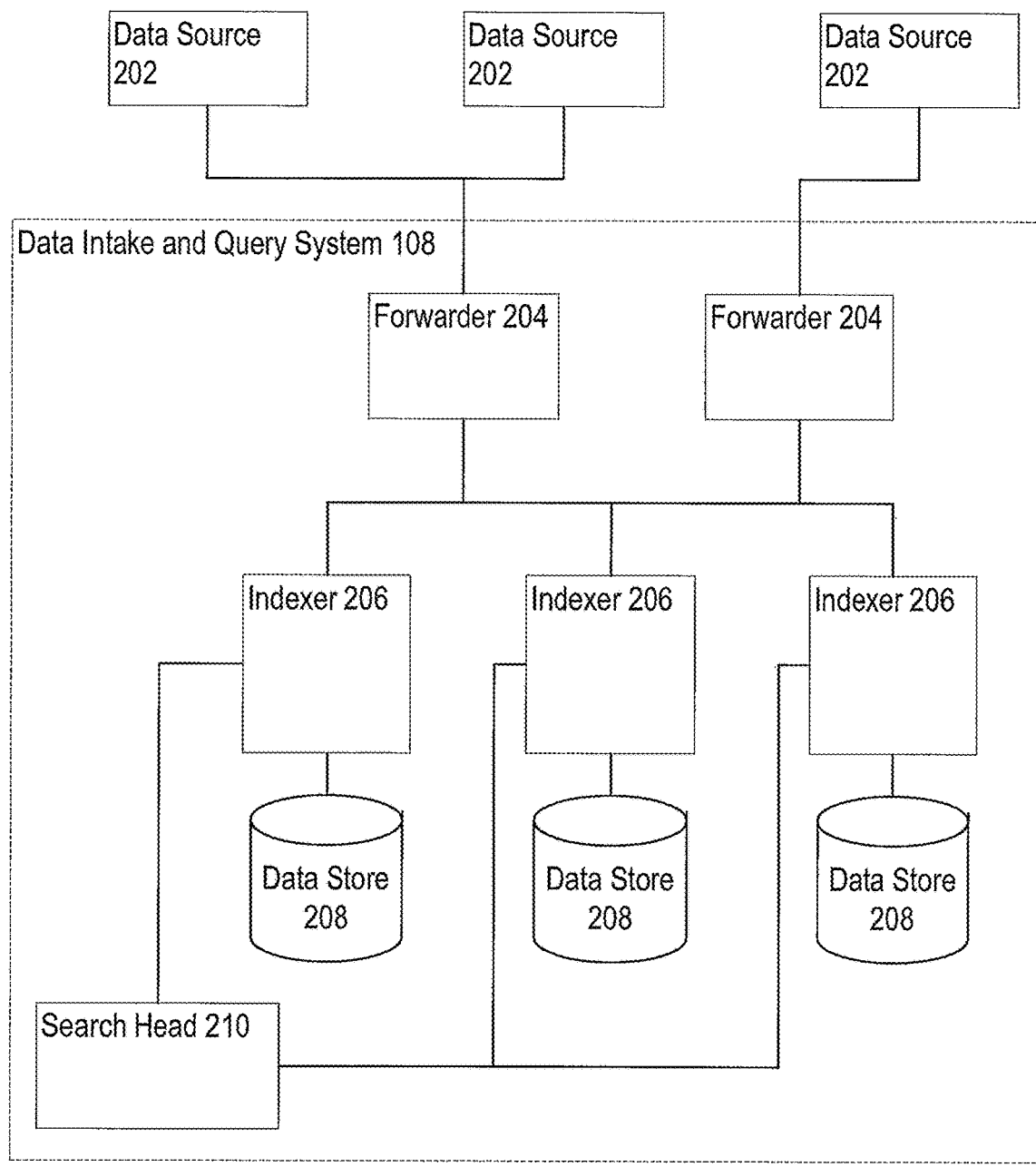
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
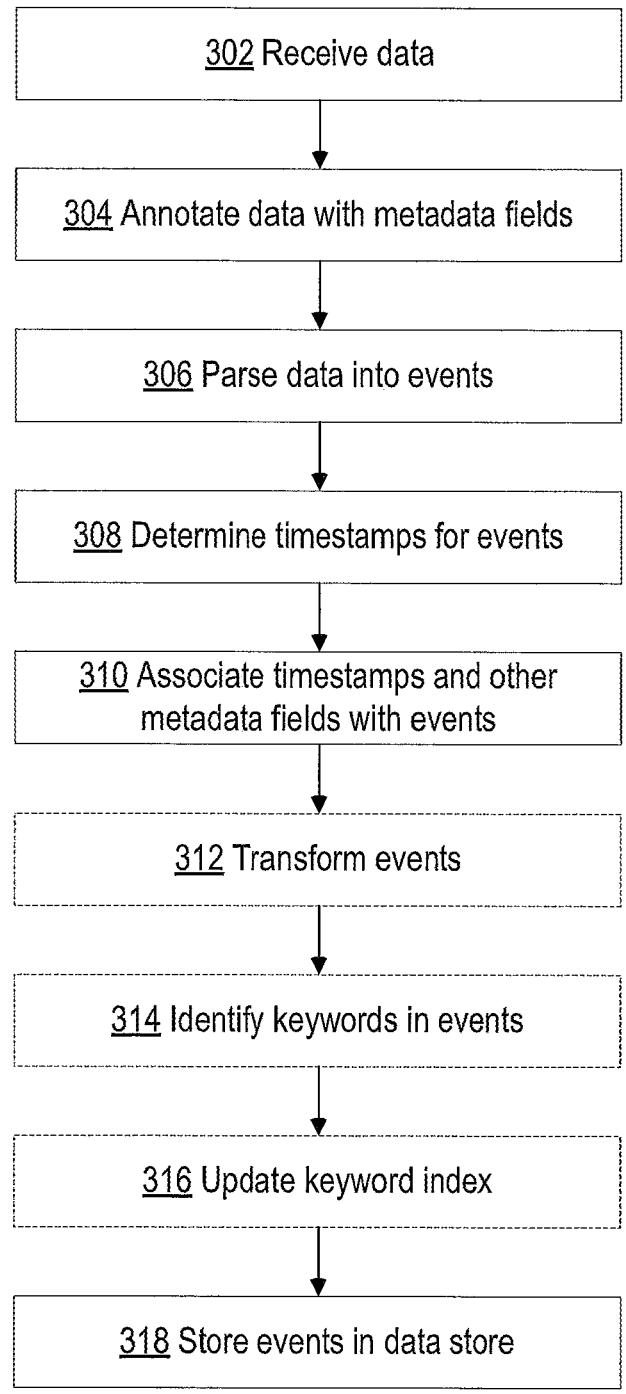
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
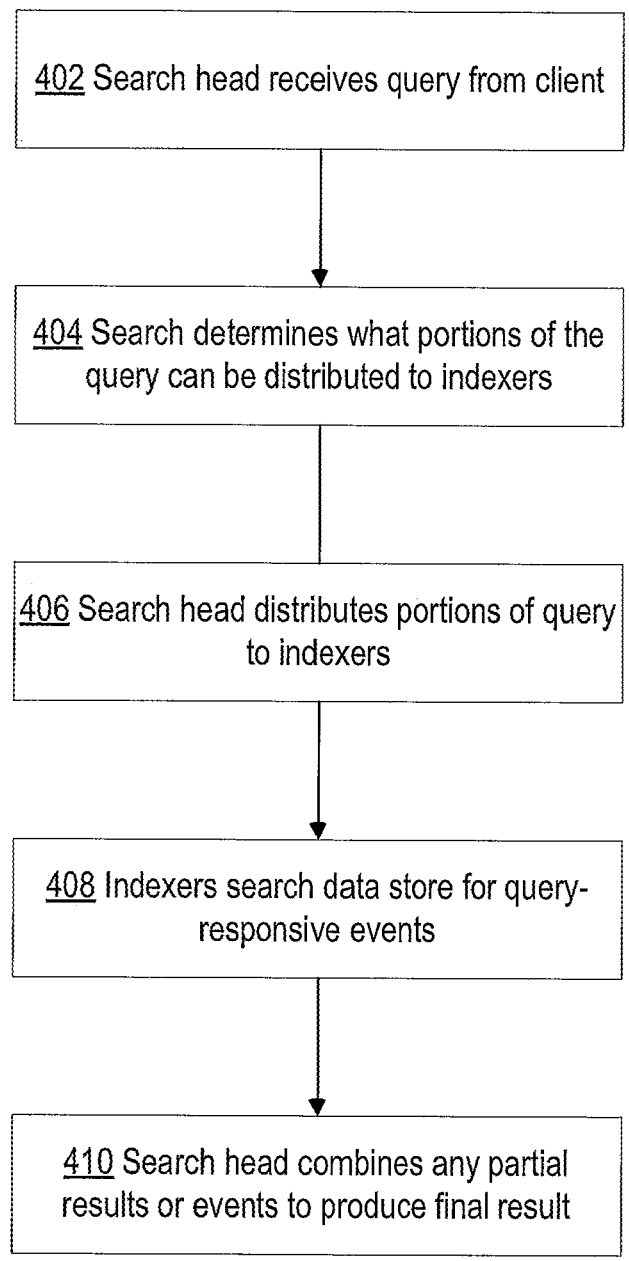
FIG. 4 is a flow diagram that illustrates how a search head and indexers perform a search query in accordance with the disclosed embodiments.

FIG. 4 is a flow diagram that illustrates an exemplary process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
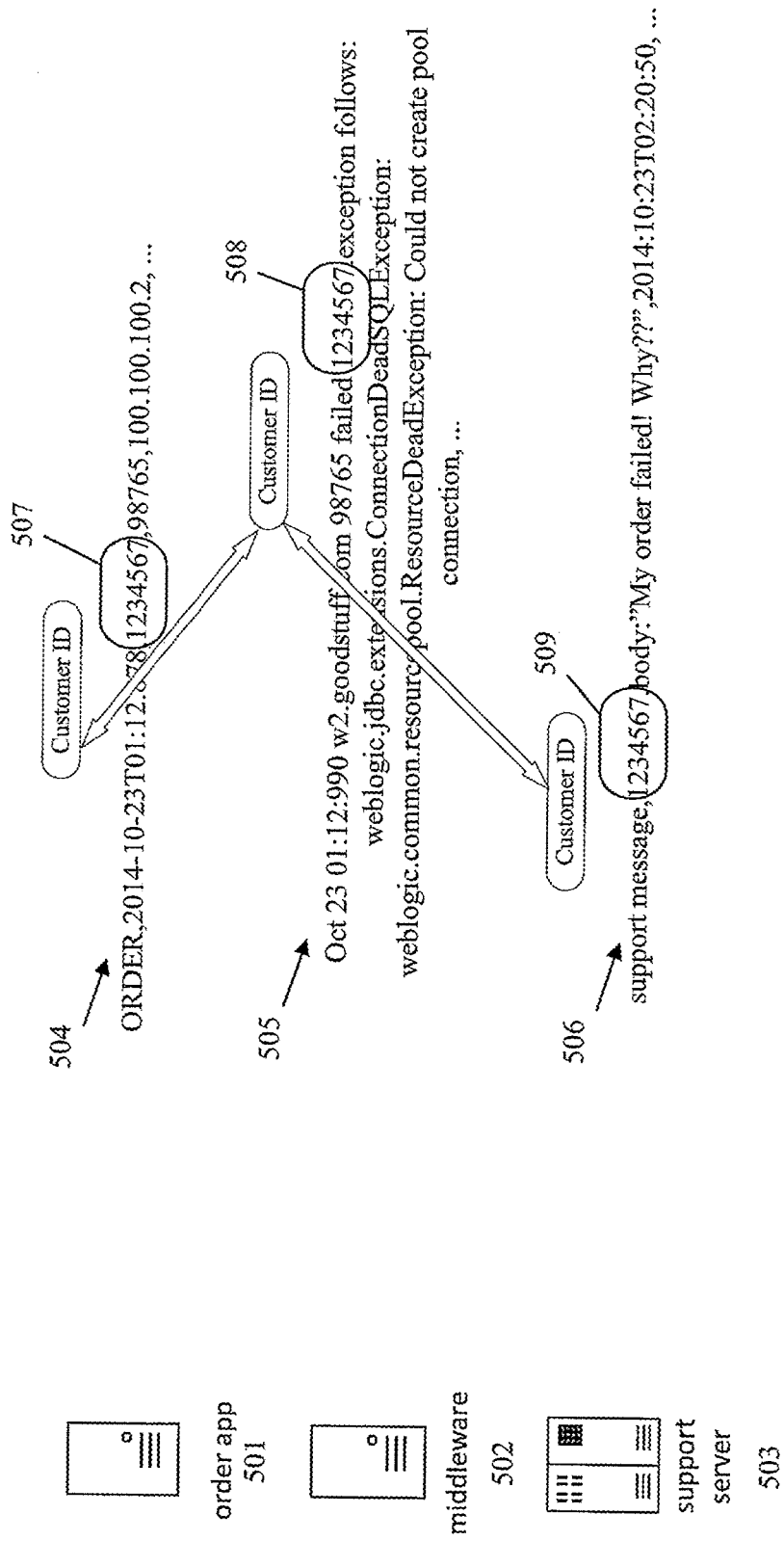
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

3.0. Application Development and Deployment System

Figure 6:
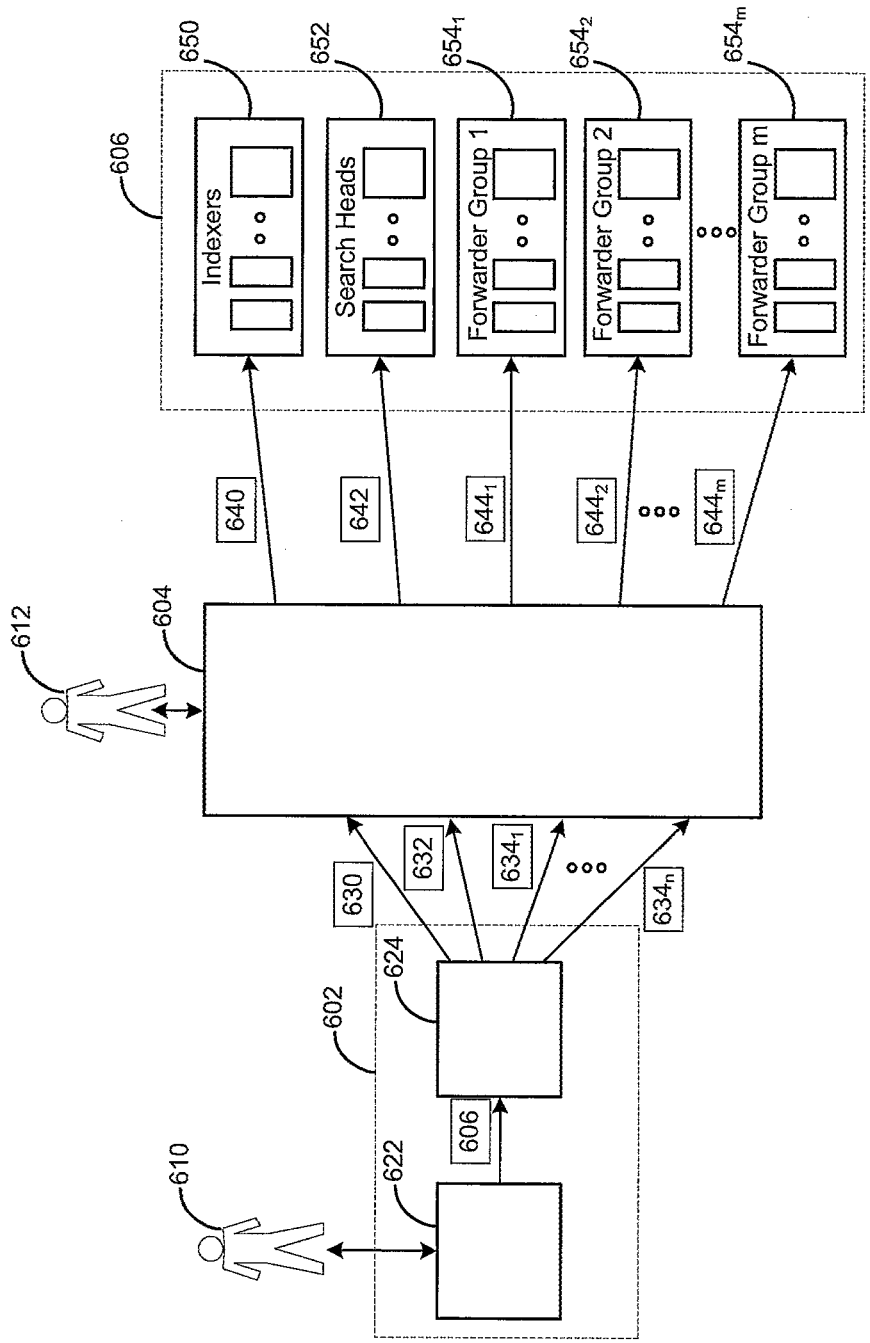
FIG. 6 depicts an exemplary application development and deployment system for a data intake and query system in accordance with some embodiments of the present disclosure.

FIG. 6 depicts an exemplary application development and deployment system for a data intake and query system in accordance with some embodiments of the present disclosure. Although an application development and deployment system may be implemented in any suitable environments for use by any suitable user types, in an embodiment the application development and deployment system may include an application development system 602 operated by application developers 610 and an application deployment system 604 operated by data intake and query system (DIQS) administrators 612. An application developer 610 may operate the application development system 602 to create an application as a set of application packages (e.g., application packages 630, 632, and $634_1$-$634_n$) that are provided to the application deployment system 604. The DIQS administrator may then utilize the application deployment system 604 to provide the application to the application partitioner 624 to generate deployment packages (e.g., deployment packages 640, 642, and $644_1$-$644_m$) that are distributed and installed at the data intake and query system 606.

As described herein, a data intake and query system may include a number of devices performing different functions within the data intake and query system. In the data intake and query system 606 of FIG. 6, the data intake and query system includes physical and logical groups. In an embodiment, physical groups my refer to classes of servers that perform a unique function within the data intake and query system, such that all indexers 650 may form one physical group, all search heads 652 may form another physical group, and all forwarders 654 may form yet another physical group. Because each physical group performs a unique function, it is not necessary for each physical group to receive and install a complete application, which may include a significant amount of code that is not germane to the operations of the physical group. Similarly, any of the physical groups may include one or more logical groups, each of which may define a unique sub-task that is performed by the servers within a particular logical group. In an embodiment, the physical group of forwarders 654 may include a plurality of logical groups $654_1$-$654_m$ (e.g., forwarder groups). Each logical group $654_1$-$654_m$ of forwarders may perform a unique sub-task, such as receiving and forwarding data from a particular data source.

In an embodiment, the application development system 602 may include application development environment 622 and application partitioner 624. An application developer 610 may interact with the application development environment 622 to create, develop, troubleshoot, test, and emulate an application for eventual deployment to data intake and query system 606. In some embodiments, application development environment may exchange information with application partitioner 624 to assist in creating, developing, troubleshooting, testing, and emulating the application. Once an application has been developed, the source application package 626 (e.g., source code, configuration files, pre-deployment configuration settings, dependency settings, and an application manifest) may be provided to the application partitioner 624 from the application development environment 622. In an embodiment, the source application package may be a single package that includes all of the necessary information to provide application code to each of the components of the data intake and query system 606. Application partitioner 624 may utilize the information provided in the source application package 626 to generate targeted application packages to be provided to the application deployment system 604, in order to provide targeted deployment packages to the physical and logical groups of the data intake and query system 606. In an embodiment, the application partitioner 624 may generate an indexer application package 630, a search head application package 632, and forwarder group application packages $634_1$-$634_n$.

The application packages 630, 632, and $634_1$-$634_n$ may be provided to the application deployment system 604 from the application partitioner 624 of the application development system 602. Application packages may be provided from the application partitioner 624 in such a way that the application packages may be deployed as deployment packages to a number of disparate data intake and query systems 606, as long as the target system includes the appropriate physical and logical groups required for the application. The application deployment system 604 may be associated with and may configure the application packages for deployment to a particular data intake and query system 606, i.e., to target the specific physical and logical groups of the particular data intake and query system 606. In an embodiment, the application deployment system 604 may have information about the components of the data intake and query system 606 (e.g., indexers 650, search heads 652, and forwarder groups $654_1$-$654_m$). The application deployment system 604 may provide a user interface (e.g., a GUI and/or command line interface) that allows the DIQS administrator 612 to configure the deployment and updating the application packages for the particular deployment, and providing deployment packages (e.g., indexer deployment package 640, search head deployment package 642, and forwarder group deployment packages $644_1$-$644_m$) to the data intake and query system 606. The deployment packages may then be installed at the appropriate physical and logical groups of the data intake and query system (e.g., indexer deployment package 640 may be installed at each of indexers 650, search head deployment package 642 may be installed at each of search heads 652, and forwarder group deployment packages $644_1$-$644_m$ may be stored at corresponding forwarder groups $654_1$-$654_m$).

3.1. Application Development Environment

Figure 7:
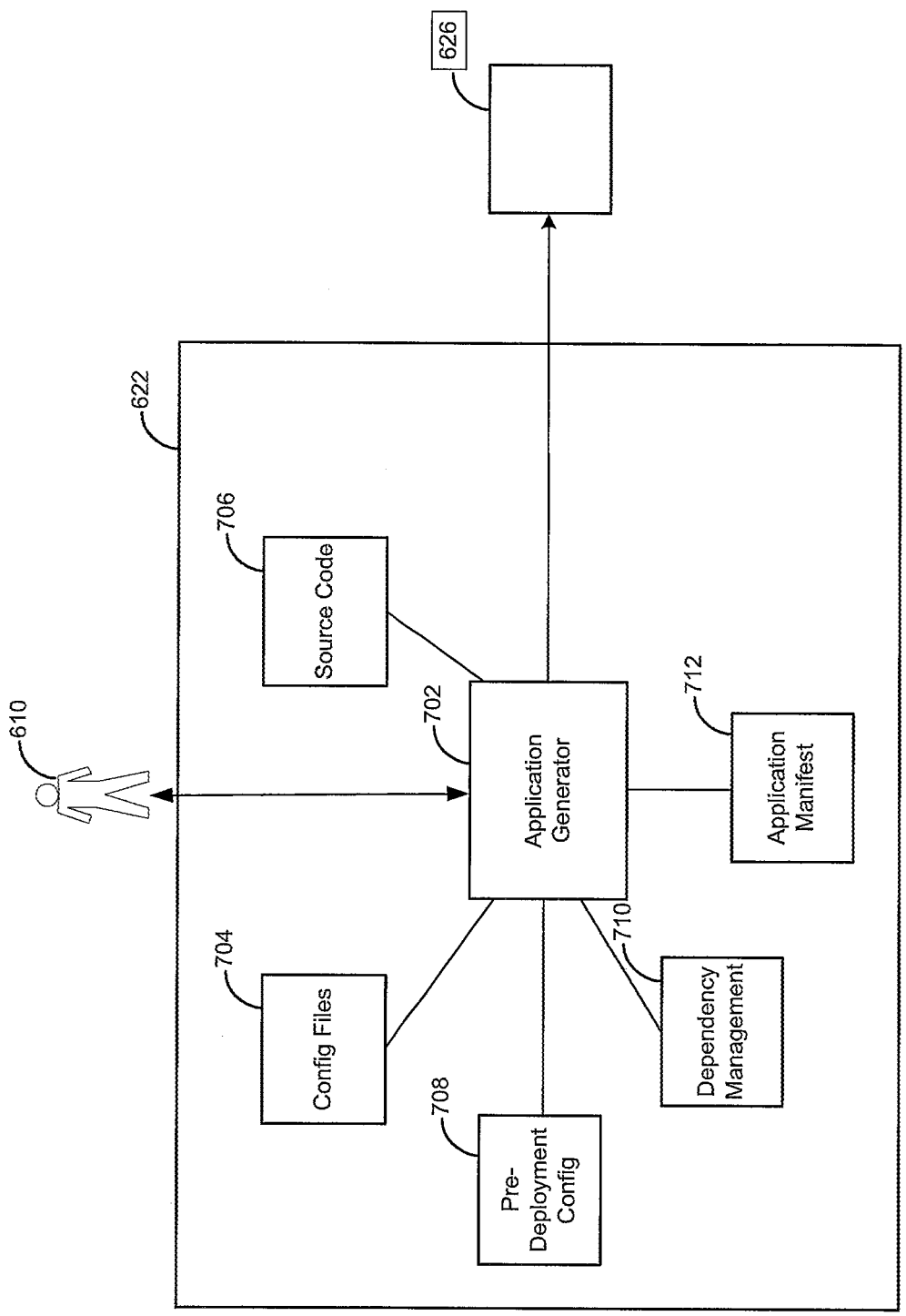
FIG. 7 depicts an exemplary application development environment in accordance with some embodiments of the present disclosure.

FIG. 7 depicts an exemplary application development environment 622 in accordance with some embodiments of the present disclosure. Although application development environment 622 is depicted as a set of blocks including particular functionality, it will be understood that the application development environment may be implemented on suitable computing devices including processers executing instructions stored in memory, to perform the functions described herein. In an embodiment, application development environment 622 may be implemented as an integrated development environment in which application developers 610 may access aspects of the application development environment 622 from local devices (e.g., workstations, desktops, laptops, tablets, etc.) while other aspects of the application development environment are accessible from servers (e.g., local, remote, and/or cloud servers). In this manner, application developers 610 can work from shared resources of the application development environment 622 to create complex applications for eventual deployment at data intake and query systems.

Although an application development environment 622 may include any suitable components, in an embodiment the application development environment 622 may include a set of modules that provide for aspects of the operation of the application development environment 622. Although each module may be implemented in any suitable manner, in an embodiment the modules may be implemented as software instructions that are executed on one or more processors of one or more devices or servers of the application development environment, as well as data stored in memory that may be utilized by the modules. In an embodiment, the modules of the application development environment may include an application generator module 702, a configuration file module 704, a source code module 706, a pre-deployment configuration module 708, a dependency management module 710, and an application manifest module 712. Although these modules are depicted and described herein as being components of the application development environment 622, it will be understood that in some embodiments one or more of these modules or any suitable functionality thereof may be located elsewhere within the application development system 602 (e.g., at application partitioner 624). In an embodiment, an application developer 610 accesses all of these modules through a single application development interface.

In an embodiment, application generator module 702 may perform a variety of functions in order to generate the source application package 626 based on interactions with application developers 610, the operation and information associated with the other modules of application development environment 622, and communications with application partitioner 624. In an embodiment, application generator module 702 may provide a rich user interface and/or information necessary to generate a rich user interface for application developers 610 to interact with modules of the application development environment. An exemplary user interface may allow a user to access and modify parameters and I/O for configuration files of configuration file module 704, create source code for source code module 706, set pre-deployment configuration parameters for physical or logical groups for pre-deployment configuration module 708, define dependency relationships for applications with dependency module 710, and create an application manifest for use in defining deployment parameters with application manifest module 712. Based on the user inputs of the application developer 610, the application generator module 702 may update code, information, and parameters associated with the other modules, and generate (e.g., automatically or in response to a request by an application developer) a complete source application package 626 for the application. In some embodiments, application generation module 702 may automatically perform certain functionality, such as generating some or all sections of an application manifest, identifying and defining dependency relationships, setting available configuration parameters for pre-deployment configuration, and developing (e.g., emulating, testing, and debugging) source code and configuration files. In some embodiments, application generator module 702 may communicate with one or more external components (e.g., application partitioner 624) to perform some aspects of this functionality.

Configuration file module 704 may include configuration files that are customized for data intake and query systems, and that provide specific functionality for components of data intake and query systems. By utilizing configuration files of configuration file module 704, an application developer 610 can develop applications that implement functionality that is known to be operational, and by providing inputs to and receiving outputs from those files, may more easily develop complex applications. Configuration file module 704 may include interfaces that define the portions of the configuration that may be modified, as well as inputs and outputs that the application developer 610 is permitted to utilize. An exemplary listing of configuration files and summary of the functionality provided by these configuration files is provided in Table 1.

TABLE 1

| Configuration File | Description |
| --- | --- |
| alert_actions.conf | Defines saved search actions. Saved searches are configured in savedsearches.conf. |
| app.conf | Identifies and defines the state of a given app. Allows aspects of the application to be customized. |
| authorize.conf | Configures roles and granular access controls. |
| collections.conf | Defines the KV Store collections for an app. |
| commands.conf | Declares custom search commands. |
| crawl.conf | Configures the crawl search command which examines the file system to discover new sources to index, using built-in settings. |
| datamodels.conf | Defines data models. |
| datatypesbnf.conf | Configures how the search assistant shows the syntax for search commands. |
| distsearch.conf | Configures distributed search. |
| eventtypes.conf | Configure event types and their properties. |
| fields.conf | Configures multi-value field handling, distinguishes between indexed and extracted fields, and improves search performance by telling the search processor how to handle field values. |
| indexes.conf | Defines DIQS indexes and their properties. |
| inputs.conf | Defines inputs to DIQS. |
| limits.conf | Sets limits for search commands. |
| macros.conf | Defines search language macros. |
| multikv.conf | Defines rules by which table-like events are extracted at search time. |
| props.conf | Defines data processing rules. |
| restmap.conf | Defines REST endpoints. App use cases include management interfaces for custom search commands, modular alerts, and modular inputs. |
| savedsearches.conf | Defines saved searches. |
| searchbnf.conf | Configures the search assistant. |
| segmenters.conf | Defines segmentation rules to be applies at index time for a host, source, or sourcetype. |
| tags.conf | Sets any number of tags for indexed or extracted fields. |
| times.conf | Defines custom time ranges. |
| transactiontypes.conf | Defines transaction searches and their properties. |
| transforms.conf | Defines search- and index-time transformations. |
| ui-prefs.conf | Defines UI preferences for a view. |
| user-prefs.conf | Defines some of the settings that can be configured on a per-user basis for use by the DIQS Web UI. |
| viewstates.conf | Records the state of a view. |
| workflow_actions.conf | Configures workflow actions. |
| audit.conf | Configures auditing and event signing in audit.conf |
| wmi.conf | Configures WMI data collection from a Windows machine. |

Source code module 706 may interface source code written by an application developer 610 to interface with the configuration files of configuration file module 704 as well as other modules of the application development environment 622. In an embodiment, coding tools may be provided that generate portions of code to assist developers in creating the source code and interfacing with the other modules. Menus, prompts, and sample code may also be provided to assist in developing the source code. Although any suitable programming language may be supported by source code module 706, in an exemplary embodiment source code module may support C++ and Python.

Pre-deployment configuration module 708 may provide an interface for configuring the application for particular target resources of data intake and query systems. In some embodiments, the pre-deployment configuration module 708 may define the parameters that need to be configured for a particular installation (e.g., by a DIQS administrator 612 operating an application deployment system 604). For example, credentials may be associated with particular logical groups and may be defined by the application developer 610 via the pre-deployment configuration module 708 (e.g., a forwarder group servicing Microsoft Exchange servers, and requiring Microsoft Exchange credentials).

Dependency management module 710 may provide an interface for an application developer to manage dependencies among applications. Numerous applications may be operational on a particular data intake and query system 606, and in some embodiments, an application may be developed that calls a second level of applications. In some embodiments, the second level applications may call additional applications, and so on. Some applications may depend from a number of other applications, and applications may be situated at multiple different levels of dependency with respect to other applications. Furthermore, each application may define a version tolerance associated with dependent applications, which defines the range of versions of the dependent application that will are permissible for the calling application. These complex dependency relationships may result in a dependency tree for an application being developed within the application development environment 622. In an embodiment, dependency management module 710 may provide tools for defining and resolving dependency relationships within an application.

Dependency management module 710 may provide tools that allow an application developer 610 to define dependency relationships. Although the dependency management tools may be implemented in a variety of manners (e.g., dependency listings, etc.), in an embodiment dependency relationships may be defined based on text information provided in a dependency portion of an application manifest. Although the dependency relationships may be defined in any suitable manner, in an embodiment the information defining a dependency relationship may include information such as an application definition (e.g., a name defining the dependent application within a particular higher-level application), a dependency type (e.g., required or optional), an application group, an application name, a version tolerance (e.g., defining acceptable versions of the dependent application), and an application package (e.g., providing a location for application code for the dependent application). In some embodiments, the application developer 610 may also utilize dependency management module 710 to define anti-dependencies, which indicate that the application should not be installed if another particular application or dependency relationship is installed at the data intake and query system 606. For example, an anti-dependency relationship may be defined for certain sophisticated "heavy" applications which consume a lot of system resources or deprecated application which the application developer is aware of and prefers not to have installed with the application. Each dependent application may include a similar manifest defining its own dependencies. An example of portions of an application manifest defining dependency relationships is provided in the example below, in which a "Splunk App for Microsoft Exchange" has dependent applications "Splunk Add-on for Microsoft IIS" and "Splunk Add-on for Microsoft Windows."

```
{
  "schemaVersion": "1.0",
  "info": {
      "title": "Splunk App for Microsoft Exchange", "id": {
  "group": "com.splunk.app", "name": "microsoft exchange",
  "version": "3.1.3"},
  ...
  },
  "dependencies": [
      "Splunk Add-on for Microsoft IIS": {
        "type": "required",
        "app": {
           "group": "com.splunk.addon",
           "name": "microsoft_iis",
           "version": "[2.1,2.2)"
         },
         "package": "com.splunk.addon-microsoft_windows-2.1.1.tar.gz"
      },
      "Splunk Add-on for Microsoft Windows": {
        "type": "required",
        "app": {
           "group": "com.splunk.addon",
           "name": "microsoft_windows",
           "version": "[4.7,4.8)"
         },
         "package": "com.splunk.addon-microsoftwindows-4.7.5.tar.gz"
      }
      ...
   }
}
```

Dependency management module 710 may utilize the dependency relationships (e.g., as provided in the application manifest) to determine dependent application compatibility based on a set of rules for resolving conflicts between dependencies. In an embodiment, the dependency management module 710 may identify each instance within the dependency tree in which a dependent application is required, and determine the version tolerance associated with each instance. The version tolerances may then be used to determine how or if the dependent application should be packaged within the source application package 626. In an embodiment, an application may access the version tolerances for each application, and for an application that is a dependent application for multiple applications, may determine a range of versions that is acceptable for all of the defined dependency relationships. If there is no overlap between acceptable versions, a warning or similar indication may be provided to the application developer 610. In some embodiments, the dependency management module 710 may communicate with other components of the application development system to determine if the versions defined by the application developer are compatible with dependencies for existing applications that may also be installed at a data intake and query system 606. In some embodiments, this analysis may be performed in conjunction with dependency rules 908 of application deployment system 604.

Application manifest module 712 may provide for the creation and development of an application manifest for the application. Although an application manifest may include any suitable information for an application, in an exemplary embodiment the application manifest may provide descriptive information, group information, and dependency information, which may be parsed by the application partitioner 624 in order to determine how to partition the source application package 626 into a plurality of application packages (e.g., indexer application package 630, search head application package 632, and forwarder group application packages 634$_1$-634$_n$). In some embodiments, aspects of the application manifest may be generated automatically, based on inputs from an application developer 610, information about a target data intake and query system, standard application manifest formats, related applications, or any combination thereof. The application developer 610 may then work from this example application manifest to develop a complete application manifest. An exemplary application manifest, including descriptive information (e.g., "schema version," "info," "author," "releaseDate," "description classification," "license," and "privacyPolicy") and information regarding logical groups (e.g., inputs for forwarder groups "all," "Active Directory Domain Services," "DHCP Server," "Windows Event Log," "Windows Host Monitor," 'Windows Performance Monitor," "Windows Network Monitor," "Windows Print Monitor," Windows Registry," and "Windows Update Monitor") is provided below.

```
{
  "schemaVersion": "1.0",
  "info": {
     "title": "Splunk Add-on for Microsoft Windows",
     "id": {
        "group": "com.splunk.addon",
        "name": "microsoft_windows",
        "version": "4.7.5"
     },
     "author": [
        {
          "name": "author",
          "email": "dev@splunk.com",
          "company": "Splunk, Inc."
        }
     ],
     "releaseDate": "10-22-2015",
     "description": "Splunk can be used to monitor your Windows machines for changes, performance over time, and important system information such as security audits and alerts. The Splunk Add-on for Windows is a collection of inputs and knowledge to accelerate your use of Splunk for common Windows monitoring tasks.",
     "classification": {
```

-continued

```
    "intendedAudience": "System Administrators",
    "categories": [
        "IT Operations",
        "Application Management",
        "Add-on"
    ],
    "developmentStatus": "Production/Stable"
},
"license": {
    "name": "Splunk Software License Agreement",
    "text": "./app-license.html",
    "uri":
"http://www.splunk.com/en_us/legal/splunk-software-license-
agreement.html"
},
"privacyPolicy": {
    "name": "Splunk Privacy Policy",
    "text": "./app-privacy.html",
    "uri":
"http://www.splunk.com/en_us/legal/splunk-software-privacy-
policy.html"
    }
},
"forwarderGroups": {
    "all": {
        "inputs": [
            "admon://default",
            "monitor://$WINDIR\\System32\\DHCP",
            "monitor://$WINDIR\\WindowsUpdate.log",
            "perfmon://CPU",
            "perfmon://LogicalDisk",
            "perfmon://Memory",
            "perfmon://Network",
            "perfmon://PhysicalDisk",
            "perfmon://Process",
            "perfmon://System",
            "script://.\\bin\\win_installed_apps.bat",
            "script://.\\bin\\win_listening_ports.bat",
            "WinEventLog://Application",
            "WinEventLog://Security",
            "WinEventLog://System",
            "WinHostMon://Application",
            "WinHostMon://Computer",
            "WinHostMon://Disk",
            "WinHostMon://Driver",
            "WinHostMon://NetworkAdapter",
            "WinHostMon://OperatingSystem",
            "WinHostMon://Process",
            "WinHostMon://Processor",
            "WinHostMon://Roles",
            "WinHostMon://Service",
            "WinNetMon://inbound",
            "WinNetMon://outbound",
            "WinPrintMon://driver",
            "WinPrintMon://port",
            "WinPrintMon://printer",
            "WinRegMon://default",
            "WinRegMon://hkcu_run",
            "WinRegMon://hklm_run"
        ]
    },
    "Active Directory Domain Services": {
        "inputs": [
            "admon://default"
        ]
    },
    "DHCP Server": {
        "inputs": [
            "monitor://$WINDIR\\System32\\DHCP"
        ]
    },
    "Windows Event Log": {
        "inputs": [
            "WinEventLog://Application",
            "WinEventLog://Security",
            "WinEventLog://System"
        ]
    },
    "Windows Host Monitor": {
        "inputs": [
            "WinHostMon://Application",
            "WinHostMon://Computer",
            "WinHostMon://Disk",
            "WinHostMon://Driver",
            "WinHostMon://NetworkAdapter",
            "WinHostMon://OperatingSystem",
            "WinHostMon://Process",
            "WinHostMon://Processor",
            "WinHostMon://Roles",
            "WinHostMon://Service"
        ]
    },
    "Windows Performance Monitor": {
        "inputs": [
            "perfmon://CPU",
            "perfmon://LogicalDisk",
            "perfmon://Memory",
            "perfmon://Network",
            "perfmon://PhysicalDisk",
            "perfmon://Process",
            "perfmon://System"
        ]
    },
    "Windows Network Monitor": {
        "inputs": [
            "WinNetMon://inbound",
            "WinNetMon://outbound"
        ]
    },
    "Windows Print Monitor": {
        "inputs": [
            "WinPrintMon://driver",
            "WinPrintMon://port",
            "WinPrintMon://printer"
        ]
    },
    "Windows Registry": {
        "inputs": [
            "WinRegMon://default",
            "WinRegMon://hkcu_run",
            "WinRegMon://hklm_run"
        ],
        {
            "name": "Windows",
            "version": "[6.3,)"
        }
    ],
    "features": [ ]
    },
    "Windows Update Monitor": {
        "inputs": [
            "monitor://$WINDIR\\WindowsUpdate.log"
        ]
    }
  }
}
```

An application developer 610 may test, emulate, and debug an application within the application development environment 622. In some embodiments, a preliminary source application package 626 may be provided to the application partitioner 624 in order to determine whether the source application can be properly partitioned (e.g., based on properly defined dependencies, dependency version tolerances, logical groups, pre-deployment configuration settings, and source code/configuration file relationships). Once an application has been developed the completed source application package 626 may be provided to the application partitioner 624 to be partitioned and distributed to the application deployment system 604 for eventual installation at the data intake and query system 606.

3.2. Application Partitioner

Figure 8:
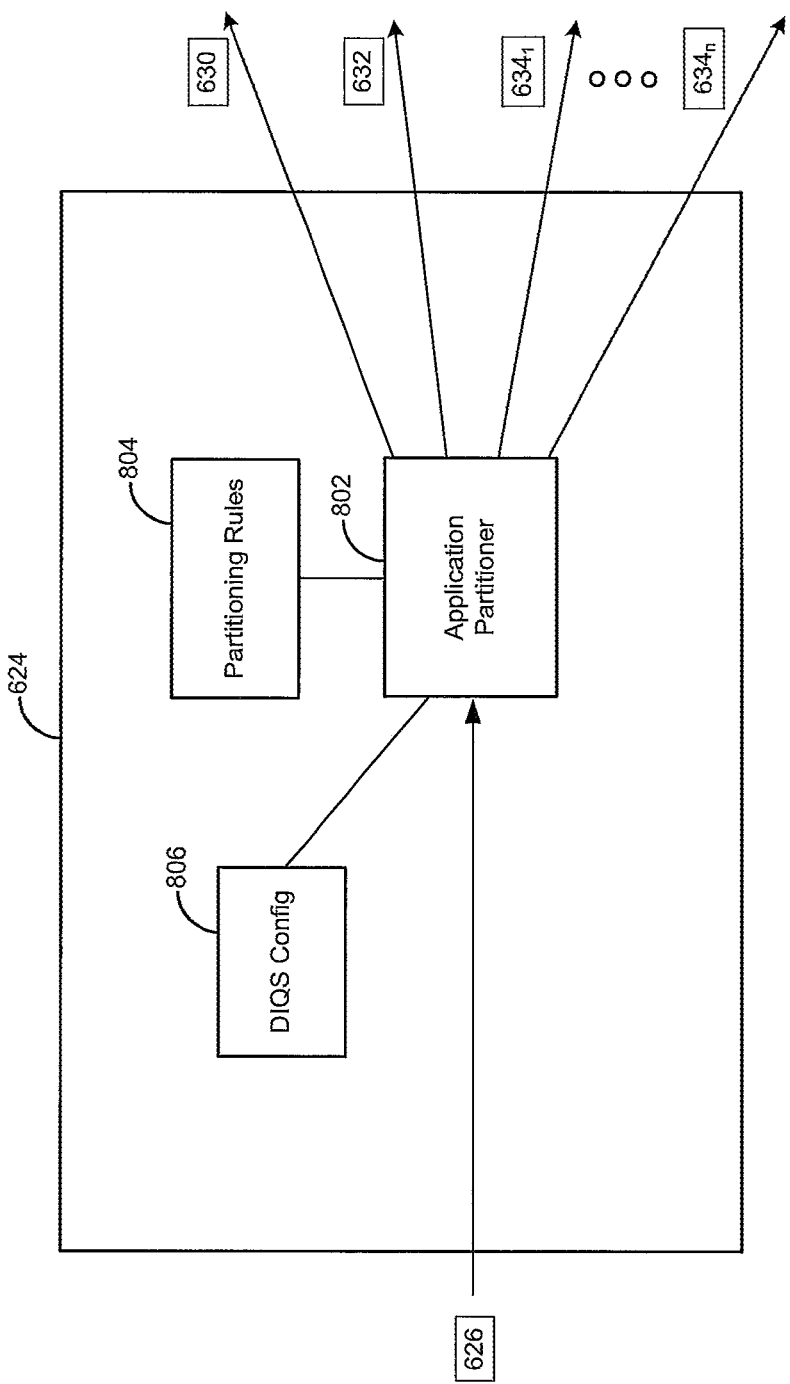
FIG. 8 depicts an exemplary application partitioning system in accordance with some embodiments of the present disclosure.

FIG. 8 depicts an exemplary application partitioner 624 in accordance with some embodiments of the present disclosure. Although application partitioner 624 is depicted as a set of blocks including particular functionality, it will be understood that the application partitioner may be implemented on suitable computing devices including processors executing instructions stored in memory, to perform the functions described herein. In an embodiment, application partitioner 624 may be implemented as a rule-based automated system in which most or all of the operations required to partition a source application package 626 are performed automatically by the hardware and software of the application partitioner. In some embodiments, at least a portion of the operations of the application partitioner 624 may operate on some of the same devices and servers as the application development environment 622 of application development system 602, or in some embodiments, application partitioner may operate entirely on separate devices and servers (e.g., local, remote, and/or cloud servers).

Although an application partitioner 624 may include any suitable components, in an embodiment the application partitioner 624 may include a set of modules that provide for aspects of the operation of the application partitioner 624. Although each module may be implemented in any suitable manner, in an embodiment the modules may be implemented as software instructions that are executed on one or more processors of one or more devices or servers of the application development environment, as well as data stored in memory that may be utilized by the modules. In an embodiment, the modules of the application partitioner may include an application partitioning module 802, a partitioning rules module 804 and a DIQS configuration module 806. Although these modules are depicted and described herein as being components of the application partitioner 624, it will be understood that in some embodiments one or more of these modules or any suitable functionality thereof may be located elsewhere within the application development system 602 (e.g., at application development environment 622) or at the application deployment system 604.

Application partitioning module 802 may receive the source application package 626 (e.g., including a package of the source code, configuration files, pre-deployment configuration settings, dependency definitions, and an application manifest) and may partition the received package into a plurality of packages that are targeted for particular physical and/or logical groups of a data intake and query system 606. In an embodiment, the partitioning of the source application package 626 may be performed automatically based on the information provided in the source application package 626 and the other modules of the application partitioner 624. Although an application may be partitioned in any suitable manner for any suitable target system, in an embodiment the application may be partitioned into three physical groups, with each physical group targeted to the unique functionality of an indexer, search head, or forwarder. The resulting application packages—e.g., indexer application package 630, search head application package 632, and forwarder application package 634—may include only the application components that are necessary for the targeted physical group. In some embodiments, one or more of the physical groups may also include a plurality of logical groups, each of which performs a unique sub-task of the physical group. In an embodiment of forwarders as a physical group, the forwarder group may include a plurality of logical groups that handle the particular forwarding sub-tasks, for example, based on the source of the data that is being provided to the data intake and query system. Each logical group may receive its own unique application package, which may include only the application components that are necessary for the targeted logical group (e.g., each of forwarder application packages $634_1$-$634_n$).

Partitioning rules module 804 may create, update, and execute partitioning rules that may be used to determine which portions of the source application package 626 are allocated to each of the application packages 630-634. In an embodiment, partitioning rules module 804 may dynamically generate and update the partitioning rules, for example, based on data and feedback from application developers 610 (e.g., via application development environment 622), DIQS administrators (e.g., via application deployment system 604), other operator-provided input (e.g., selections of an operator (not depicted) of application partitioner), and machine-generated data from any of application development system 604, application deployment system 606, and data intake and query system 606. In some embodiments, partitioning rules module 804 may use this data to automatically create or update partitioning rules using machine learning techniques (e.g., providing the input data to a neural network). In some embodiments, the partitioning rules may be created or further modified by a user of the partitioning rules module 804.

Although partitioning rules may be implemented in any suitable manner, in an embodiment partitioning rules may be implemented based on the configuration files and application manifest of the source application package 626. In an embodiment, each configuration file may be known to implement functionality of particular target physical or logical groups (e.g., indexer, search head, or forwarder), and for certain configuration files, particular settings for the configuration file may be known to implement functionality of particular target physical or logical groups. For example, the configuration files of Table 1 above may be associated with physical groups as indicated in Table 2 below.

TABLE 2

Configuration File/Physical Group Associations

| Configuration File | Group |
| --- | --- |
| alert_actions.conf | Search Head |
| app.conf | Indexer, Search Head, Forwarder |
| authorize.conf | Search Head |
| collections.conf | Search Head |
| commands.conf | Search Head |
| crawl.conf | Search Head |
| datamodels.conf | Search Head |
| datatypesbnf.conf | Search Head |
| distsearch.conf | Search Head |
| eventtypes.conf | Search Head |
| fields.conf | Indexer, Search Head |
| indexes.conf | Indexer, Search Head |

TABLE 2-continued

Configuration File/Physical Group Associations

| Configuration File | Group |
| --- | --- |
| inputs.conf | Forwarder |
| limits.conf | Indexer, Search Head |
| macros.conf | Search Head |
| multikv.conf | Search Head |
| props.conf | Indexer, Search Head, or Forwarder, depending on setting |
| restmap.conf | Indexer, Search Head |
| savedsearches.conf | Search Head |
| searchbnf.conf | Search Head |
| segmenters.conf | Indexer |
| tags.conf | Search Head |
| times.conf | Search Head |
| transactiontypes.conf | Search Head |
| transforms.conf | Indexer or Search Head, depending on setting |
| ui-prefs.conf | Search Head |
| user-prefs.conf | Search Head |
| viewstates.conf | Search Head |
| workflow_actions.conf | Search Head |
| audit.conf | Indexer, Forwarder |
| wmi.conf | Forwarder |

Based on the associations between configuration files (and settings of configuration files) and physical groups, the correct configuration files may be assigned only to the proper target application packages (e.g., indexer application package 630, search head application package 632, and/or forwarder application packages $634_1$-$634_n$). The source code from the source application package 626 may also be partitioned and assigned to particular target application packages. In an embodiment, the source code may be partitioned based on the configuration files and settings that the source code utilizes. Each portion of code (e.g., each subroutine, function call, etc.) may be associated with the configuration files or settings that it utilizes, and only distributed to the application package (e.g., indexer application package 630, search head application package 632, and/or forwarder application packages $634_1$-$634_n$) that is associated with the configuration file or setting. In an embodiment, partitioning rules 804 may also coordinate the partitioning of the source application package 626 among logical groups (e.g., forwarder application packages $634_1$-$634_n$). In an embodiment, the application manifest may include information that associates particular logical groups with particular configuration files and/or portions of source code. Once the source application package has been partitioned into physical groups, it can be further partitioned into logical groups based on the application manifest.

DIQS configuration module 806 may include information about the configurations of data intake and query systems for use by application partitioning module 802. In an embodiment, DIQS configuration module may include information relating to different types of installations of data intake and query systems that may be utilized to properly package the application portions for different target environments. In an embodiment, different partitioning or dependency rules may be applied to different target deployment topologies/environments. The application partitioning module 806 may obtain information about types of installations (e.g., based on an application manifest) that are targeted by the source application package 626, and based on this information, may adjust settings of the application partitioning module 802 and partitioning rules module 804.

3.3. Application Deployment System

Figure 9:
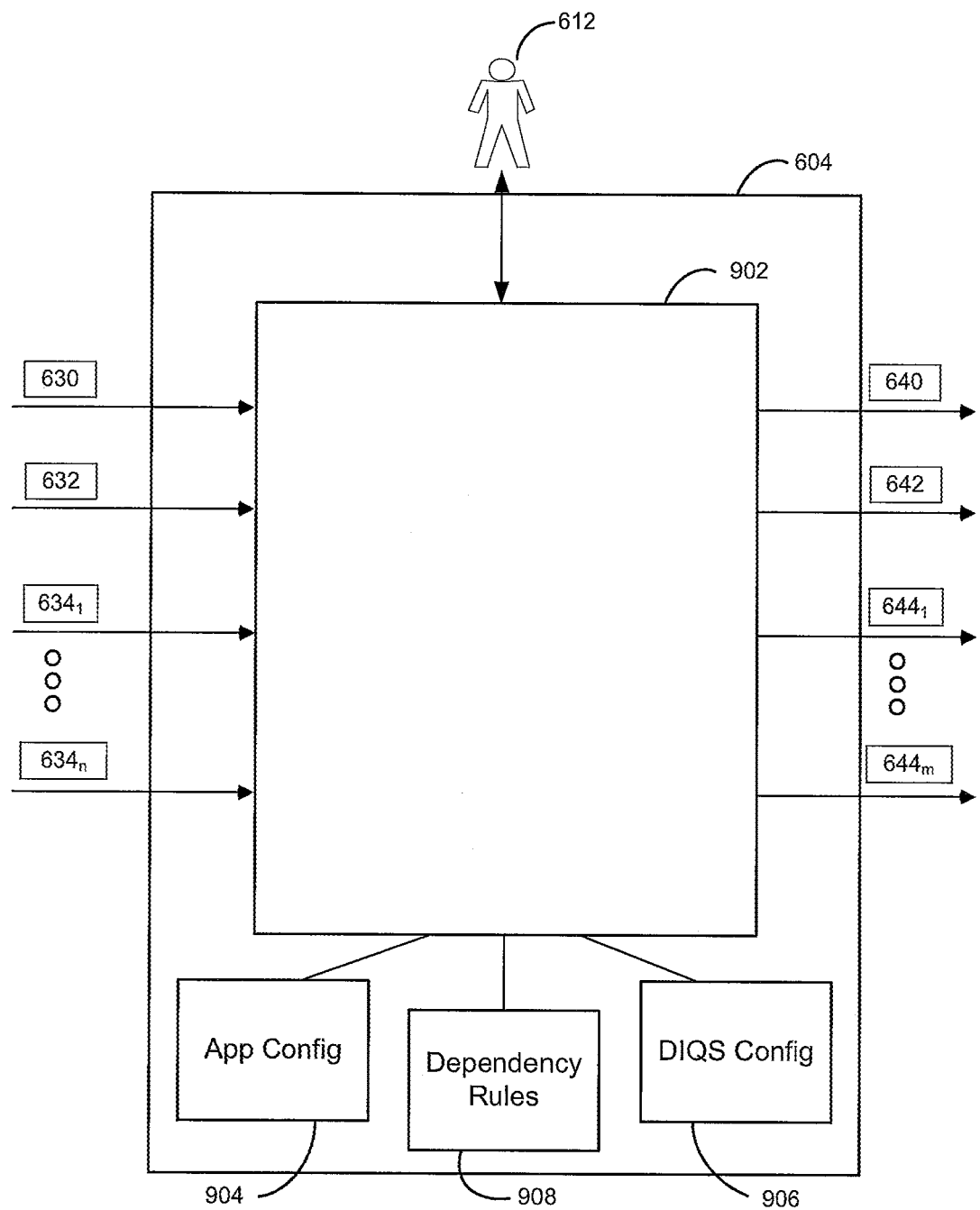
FIG. 9 depicts an exemplary application deployment system in accordance with some embodiments of the present disclosure.

FIG. 9 depicts an exemplary application deployment system 604 in accordance with some embodiments of the present disclosure. Although application deployment system 604 is depicted as a set of blocks including particular functionality, it will be understood that the application deployment system may be implemented on suitable computing devices including processers executing instructions stored in memory, to perform the functions described herein. In an embodiment, application deployment system 604 may be implemented as an integrated deployment environment in which a DIQS administrator 612 may access aspects of the application deployment system 604 from local devices (e.g., workstations, desktops, laptops, tablets, etc.) while other aspects of the application deployment system are accessible from servers (e.g., local, remote, and/or cloud servers). In this manner, DIQS administrators 612 can work from shared resources of the application deployment system 604 to deploy complex applications to a data intake and query system 606.

Although an application deployment system 604 may include any suitable components, in an embodiment the application deployment system 604 may include a set of modules that provide for aspects of the operation of the application deployment system 604. Although each module may be implemented in any suitable manner, in an embodiment the modules may be implemented as software instructions that are executed on one or more processors of one or more devices or servers of the application deployment system, as well as data stored in memory that may be utilized by the modules. In an embodiment, the modules of the application deployment system 604 may include an application deployment module 902, an application configuration module 904, a DIQS configuration module 906, and a dependency rules module 908.

Application deployment module 902 may interface with DIQS administrator 612 to control the deployment of the target application packages 630-634 to the target resources data intake and query system 606 as deployment packages 640-644, as well as the configuration of the application and data intake and query system. In an embodiment, aspects of the deployment and configuration may be performed automatically based on information provided in the incoming target application packages, by the application configuration module 904, and the DIQS configuration module 906. Exemplary information that may be determined automatically includes the deployment of certain target application packages to certain physical groups (e.g., indexer application package 630 may be packaged as indexer deployment package 640 for installation at indexers 650, and search head application package 632 may be packaged as search head deployment package 642 for installation at search heads 652) as well as the determination of certain configuration information. Other information for the deployment and configuration of the application (e.g., assignment of forwarder group application packages $634_1$-$634_n$ to forwarder groups $654_1$-$654_m$, for packaging as forwarder group deployment packages $644_1$-$644_m$) may be provided by the DIQS administrator via user interfaces (e.g., the user interfaces depicted in FIGS. 10-17 herein). Once all of the target application packages 630-634 have been assigned to particular target resources (e.g., indexers 650, search heads 652, and forwarder groups $654_1$-$654_m$) of the data intake and query system 606, the target application packages 630-634 may be packaged as indexer deployment package 640, search head deployment package 642, and forwarder group deployment packages $644_1$-$644_m$, based on the configuration information determined by the application deployment module 902 and DIQS administrator 612.

Application configuration module 904 may provide information relating to DIQS administrators 612 and a user interface for DIQS administrators to interact with application deployment system 604 (e.g., as depicted in FIGS. 10-17). In an embodiment, DIQS administrators 612 may have login or other authentication information that allows them to access the application development system, and in some embodiments, different deployment and configuration options may be available based on permissions associated with particular DIQS administrators. DIQS administrators may be able to save common configuration settings for reuse, as well as partially complete configurations. Information provided via the application configuration module 904 may be used by the application deployment module 902 to configure and deploy the deployment packages to the components of the data intake and query system 606 (e.g., indexers 650, search heads 652, and forwarder groups $654_1$-$654_m$).

DIQS configuration module 906 may include information related to a data intake and query system 606 that is associated with the application deployment system. In an embodiment, the DIQS configuration module may access information relating to each of the components of the data intake and query system 606 (e.g., indexers 650, search heads 652, and forwarder groups $654_1$-$654_m$) such as location, address, installed applications and their versions, license information, dependencies, configuration parameters, physical group, and logical group. This information may be used along with the incoming target application packages 630-634 to configure and deploy the deployment packages to the components of the data intake and query system 606.

Dependency rules module 908 may provide sets of rules that resolve conflicts between dependencies of the source application package 626 and installed applications in a data intake and query system 606. In some embodiments, the dependency rules module 908 may have stored information (e.g., installed versions, dependencies, and version tolerances) relating to the applications that are currently located at different data intake and query systems 606. Although the dependency rules module 908 may resolve dependencies in any suitable manner, in an embodiment the dependency rules module 908 may implement a series of dependency rules.

One exemplary dependency rule may resolve conflicts where an application to be installed (e.g., any dependent application) is not compatible with existing dependencies and version tolerances of applications at the data intake and query system 606. Dependency rules module may compare the dependencies and version tolerances of the application to be installed at a particular physical or logical group to the dependencies and version tolerances of applications that are already installed at the particular physical or logical group. If any version that is to be installed falls outside of the version tolerances of the applications that are already installed (e.g., an application A of the data intake and query system depends on B, with version tolerance [1.0-2.0], and the version of B to be installed is version 2.1), the installation may fail. In an embodiment, a message describing the conflict may be provided to an application developer 610 (e.g., via application development environment 622) or to a DIQS administrator 612 (e.g., via application deployment system 604).

Another exemplary dependency rule may resolve conflicts where an application to be installed (e.g., any application or dependent application) is compatible with existing dependencies and version tolerances of applications at the data intake and query system 606, but would cause the installed application to be modified (e.g., upgraded or downgraded). Dependency rules module 908 may compare the dependencies and version tolerances of the application to be installed at a particular physical or logical group to the dependencies and version tolerances of the application to be installed at the particular physical or logical group. If any version that is to be installed is within the version tolerances of the applications that are already installed (e.g., an application A of the data intake and query system depends on B, with version tolerance [1.0-2.0], the installed version of B is version 1.1, and the version of B to be installed is version 1.2), the installation is allowable but will require a change to an installed application. In an embodiment, a message describing the requested change may be provided to an application developer 610 (e.g., via application development environment 622) or to a DIQS administrator 612 (e.g., via application deployment system 604), and the application developer or DIQS administrator may decide whether to move forward with the installation.

Another exemplary dependency rule may move forward with an installation where an application to be installed (e.g., any application or dependent application) is compatible with existing dependencies and version tolerances of applications at the data intake and query system 606, and would not require any installed application to be modified (e.g., upgraded or downgraded). Dependency rules module may compare the dependencies and version tolerances of the application to be installed at a particular physical or logical group to the dependencies and version tolerances of the application to be installed at the particular physical or logical group. If all of the versions that are to be installed are the same as the versions of the applications that are already installed (e.g., an application A of the data intake and query system depends on B, the installed version of B is version 1.1, and the version of B to be installed is version 1.1), the installation is allowable and may be performed automatically, without input from a user.

Another exemplary dependency rule may define anti-dependencies to indicate that an application must not be installed under certain circumstances. In an embodiment, an anti-dependency may define certain applications, dependent applications, and/or application and dependency versions as anti-dependencies. For example, an anti-dependency relationship may be defined for certain sophisticated "heavy" applications which consume a lot of system resources or deprecated application which the application developer is aware of and prefers not to have installed with the application. If an anti-dependency is identified, the application installation may be aborted or the existing installation may be modified.

Once the DIQS administrator 612 and the application deployment module 902 have completed the configuration of the application for the data intake and query system, each of the incoming target application packages may be repackaged as deployment packages (e.g., indexer application package 630 may be packaged as indexer deployment package 640, search application package 632 may be packaged as search head deployment package 642, and forwarder group application packages $634_1$-$634_n$ may be packaged as forwarder group deployment packages $644_1$-$644_m$). The deployment packages may then be distributed to the appropriate resources (e.g., workloads and/or servers, based on the deployment topology) of the data intake and query system 606 (e.g., indexers 650, search heads 652, and forwarder groups $654_1$-$654_m$).

Figure 10:
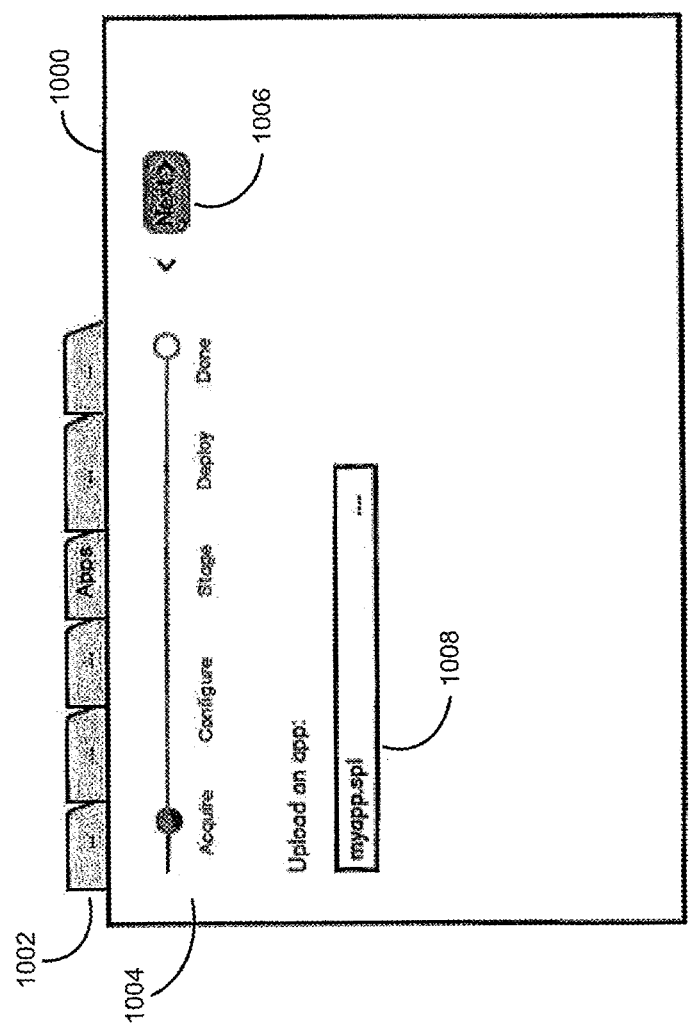
FIG. 10 depicts an exemplary application acquisition interface of an application deployment system in accordance with some embodiments of the present disclosure.

FIG. 10 depicts an exemplary application acquisition interface 1000 of an application deployment system 604 in accordance with some embodiments of the present disclosure. In an embodiment, the application acquisition interface is one of a series of user interface screens presented to a DIQS administrator 602 during configuration and deployment of an application. In an embodiment, application acquisition interface 1000 may include deployment interface tabs 1002, deployment timeline 1004, deployment navigation 1006, and application locator 1008. In an embodiment, deployment interface tabs may include tabs that allow a DIQS administrator to navigate between different functionality of the application deployment system 604, such as application deployment (depicted), interface configuration, administrator settings (e.g., for application configuration module 904), and DIQS settings (e.g., for DIQS configuration module 906). In an embodiment, deployment timeline 1004 may provide a series of steps (e.g., a "wizard") for deploying the application and depicting the progress of the DIQS administrator 612 in completing those steps. In an embodiment, deployment navigation 1006 may provide navigation tools for navigating between steps of the deployment timeline 1004. In an embodiment, application locator 1008 may provide a tool to allow the DIQS administrator 612 to select an application to deploy. Although the application locator 1008 may utilize any suitable tool, in an embodiment the application locator 1008 may provide a pull-down menu that allows the DIQS administrator 612 to select an application for deployment. Once an application is selected, the DIQS administrator 612 may select next from deployment navigation 1006 to continue to the next screen of the deployment user interface.

Figure 11:
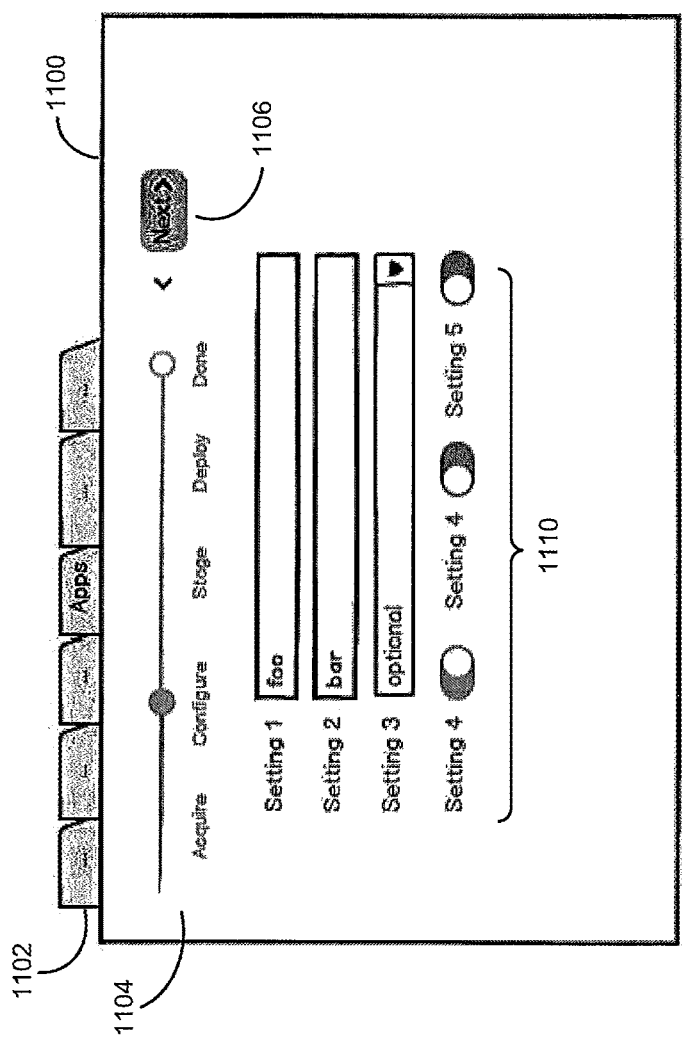
FIG. 11 depicts an exemplary application pre-deployment configuration interface of an application deployment system in accordance with some embodiments of the present disclosure.

FIG. 11 depicts an exemplary application pre-deployment configuration interface 1100 of an application deployment system 604 in accordance with some embodiments of the present disclosure. In an embodiment, application pre-deployment configuration interface 1100 may include deployment interface tabs 1102, deployment timeline 1104, deployment navigation 1106, and application settings 1110. In an embodiment, each of deployment interface tabs 1102, deployment timeline 1104, and deployment navigation 1106 may function in the same manner as described herein with respect to application acquisition interface 1000. Application settings 1110 may include any suitable user interface elements (e.g., text interfaces, pull down menus, scroll bars, radio buttons, etc.) to configure the application for deployment. Example application settings 1110 that may be configured include authentication credentials/tokens for integrating with the $3^{rd}$ party systems, geographical regions or business divisions to collect the data from, polling interval, subset of services to be monitored, or thresholds to use when triggering/throttling alerts. Once application selections are completed, the DIQS administrator 612 may select next from deployment navigation 1106 to continue to the next screen of the deployment user interface.

Figure 12:
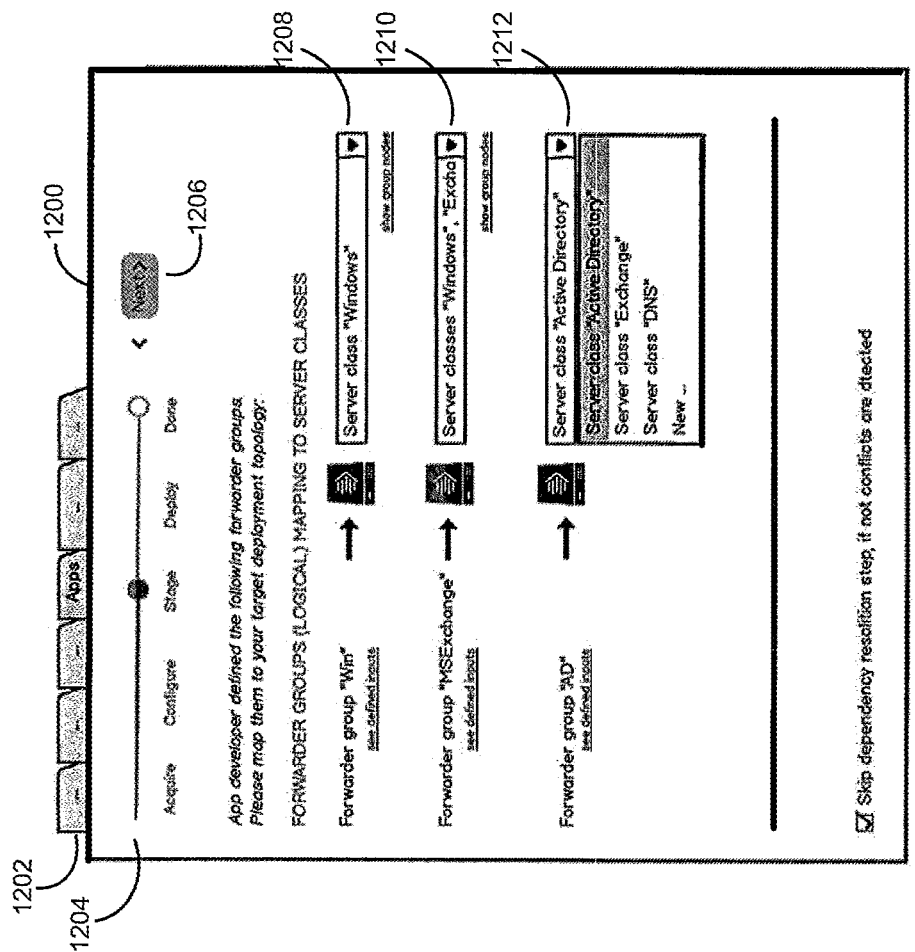
FIG. 12 depicts an exemplary application staging interface of an application deployment system in accordance with some embodiments of the present disclosure.

FIG. 12 depicts an exemplary application staging interface 1200 of an application deployment system 604 in accordance with some embodiments of the present disclosure. In an embodiment, application staging interface 1200 may include deployment interface tabs 1202, deployment timeline 1204, deployment navigation 1206, and forwarder selections 1208-1212. In an embodiment, each of deployment interface tabs 1202, deployment timeline 1204, and deployment navigation 1206 may function in the same manner as described herein with respect to application acquisition interface 1000. As described herein, the application deployment system 604 may receive forwarder application packages $634_1$-$634_n$. Forwarder selections 1208-1212 may populate a selection interface (e.g., a drop down menu) with names of available forwarder groups $654_1$-$654_m$. Based on the selections of the DIQS administrator 612, the forwarder application packages $634_1$-$634_n$ may be assigned to forwarder groups $654_1$-$654_m$ as forwarder deployment packages $644_1$-$644_m$. Once forwarder groups have been selected, the DIQS administrator 612 may select next from deployment navigation 1206 to continue to the next screen of the deployment user interface.

Figure 13:
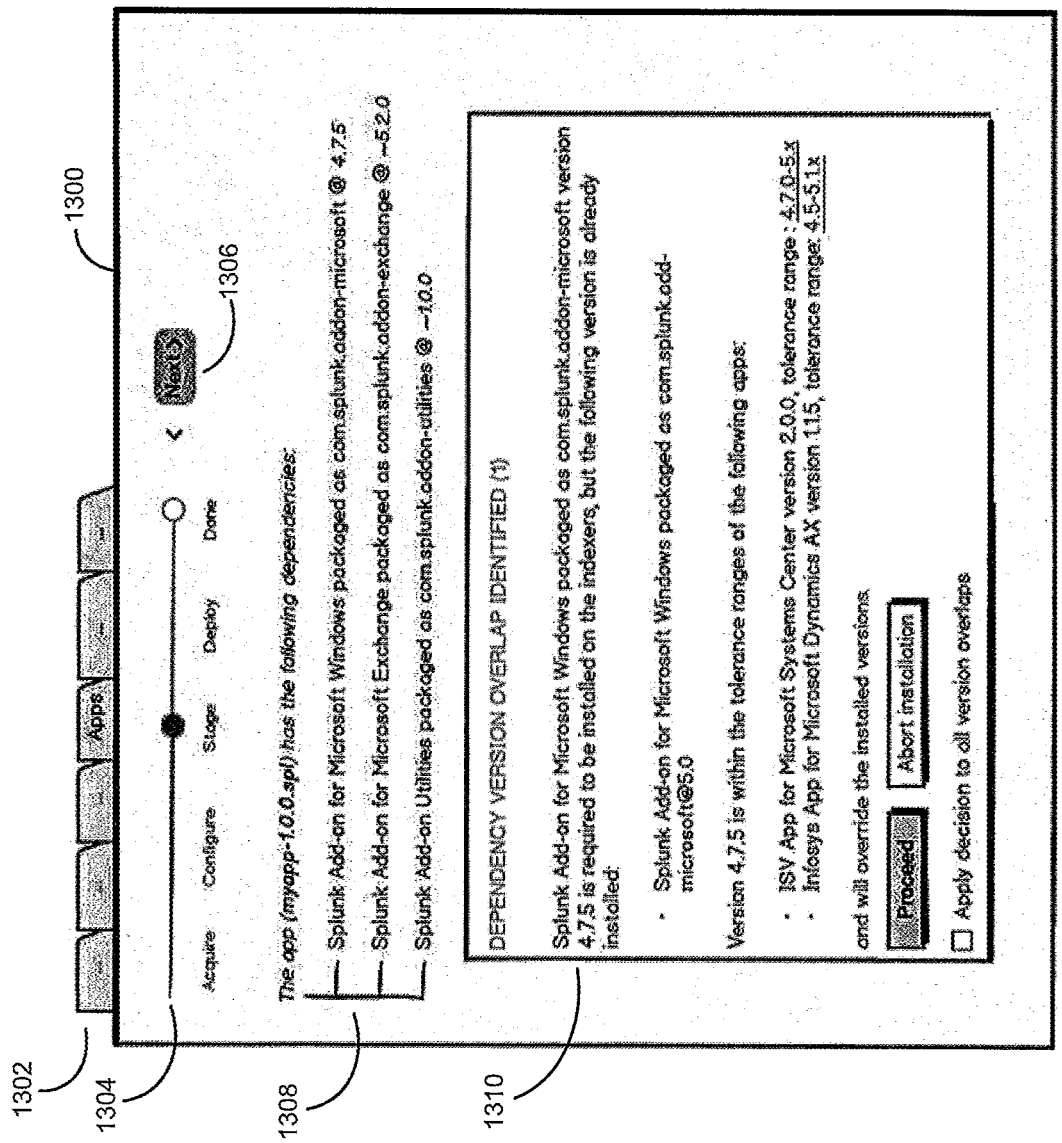
FIG. 13 depicts an exemplary dependency overlap interface of an application deployment system in accordance with some embodiments of the present disclosure.

FIG. 13 depicts an exemplary dependency overlap interface 1300 of an application deployment system 604 in accordance with some embodiments of the present disclosure. If the installed application includes dependencies that require input from a user (e.g., as a result of a dependency overlap or a conflict), a dependency interface such as dependency overlap interface 1300 or dependency resolution interface 1400 may be displayed. In an embodiment, dependency overlap interface 1300 may include deployment interface tabs 1302, deployment timeline 1304, deployment navigation 1306, dependency notifications 1308, and dependency overlap selection 1310. In an embodiment, each of deployment interface tabs 1302, deployment timeline 1304, and deployment navigation 1306 may function in the same manner as described herein with respect to application acquisition interface 1000. Dependency notifications 1308 may provide information to DIQS administrator 612 about dependent applications that are required for the application. Dependency overlap selection 1310 may provide a notification that a dependency overlap exists that may result in installation of a dependent application version that is different than currently installed versions, but is nonetheless within the tolerance ranges of installed applications. DIQS administrator 612 may be provided with a selection of whether they wish to proceed with the installation.

Figure 14:
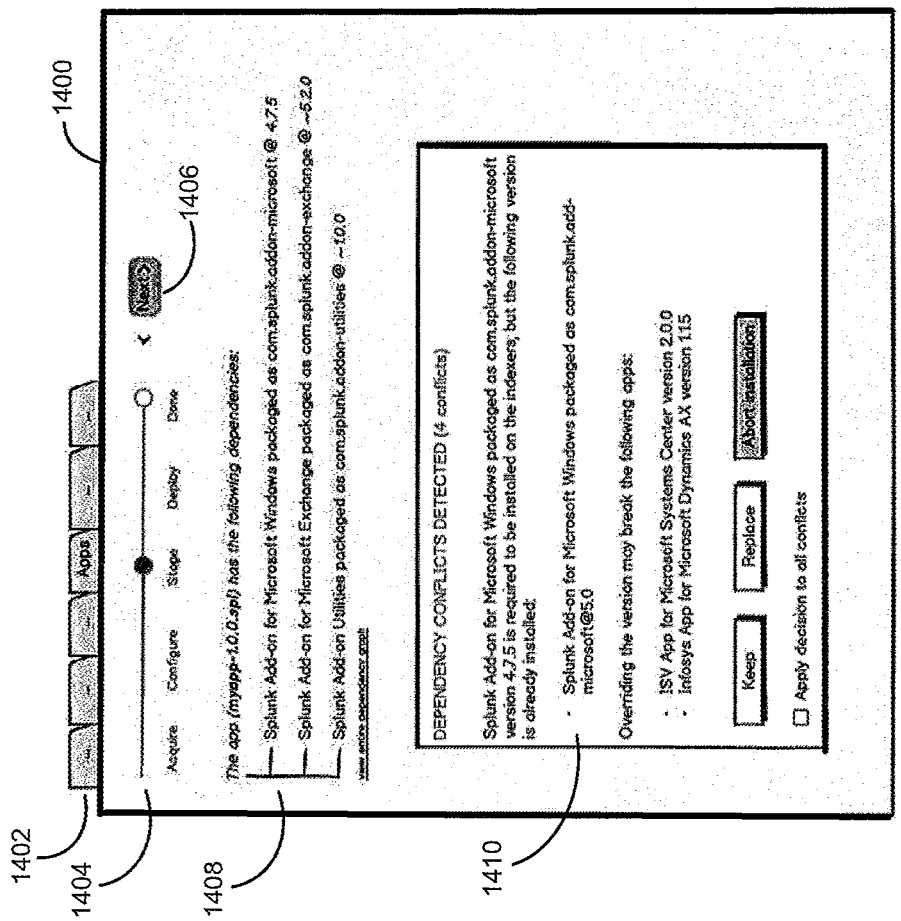
FIG. 14 depicts an exemplary dependency resolution interface of an application deployment system in accordance with some embodiments of the present disclosure.

FIG. 14 depicts an exemplary dependency resolution interface 1400 of an application deployment system 604 in accordance with some embodiments of the present disclosure. In an embodiment, dependency resolution interface 1400 may include deployment interface tabs 1402, deployment timeline 1404, deployment navigation 1406, dependency notifications 1408, and dependency conflict selection 1410. In an embodiment, each of deployment interface tabs 1402, deployment timeline 1404, and deployment navigation 1406 may function in the same manner as described herein with respect to application acquisition interface 1000. Dependency notifications 1408 may provide information to DIQS administrator 612 about dependent applications that are required for the application. Dependency conflicts selection 1410 may provide a notification that there are conflicts between version tolerances of dependent applications. DIQS administrator 612 may be provided with a selection of whether they wish to keep the existing versions, replace the versions, or abort the installation.

Figure 15:
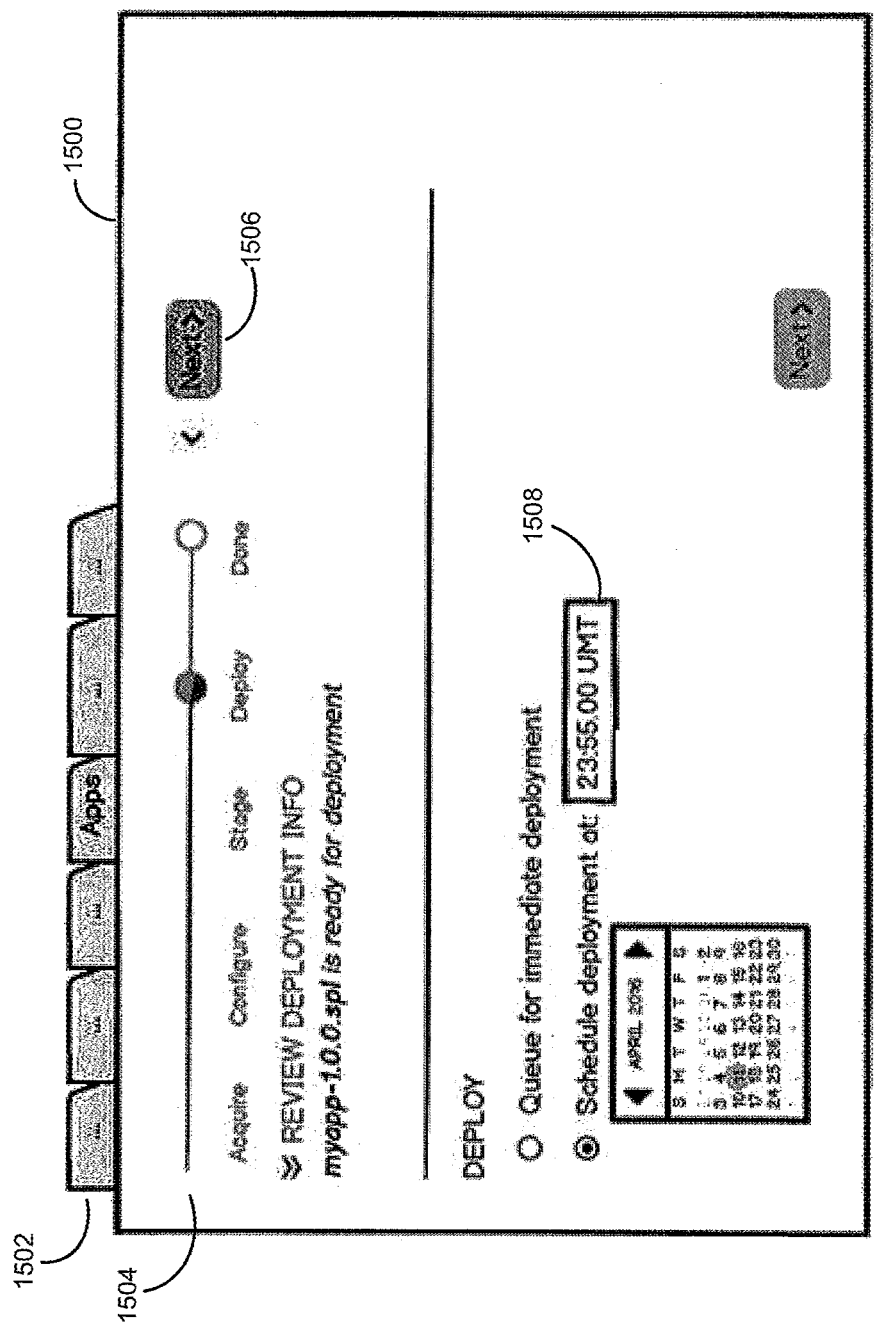
FIG. 15 depicts an exemplary deployment confirmation interface of an application deployment system in accordance with some embodiments of the present disclosure.

FIG. 15 depicts an exemplary deployment confirmation interface 1500 of an application deployment system 604 in accordance with some embodiments of the present disclosure. In an embodiment, deployment confirmation interface 1500 may include deployment interface tabs 1502, deployment timeline 1504, deployment navigation 1506, and deployment timing selection 1508. In an embodiment, each of deployment interface tabs 1502, deployment timeline 1504, and deployment navigation 1506 may function in the same manner as described herein with respect to application acquisition interface 1000. Although the deployment timing may be determined in any suitable manner, in an embodiment the application may be deployed immediately or at a time and date set by DIQS administrator 612 based on deployment timing selection 1508.

Figure 16:
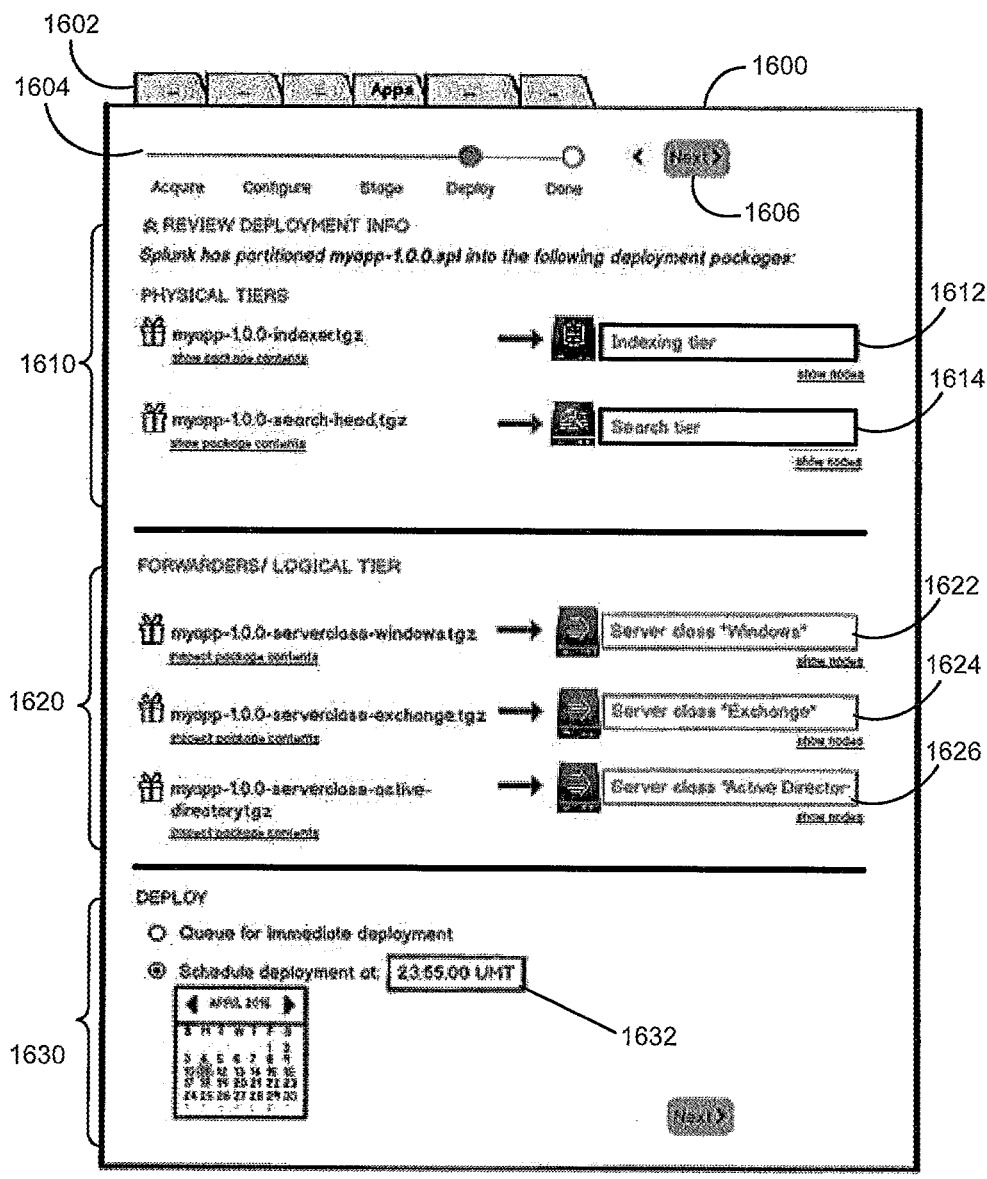
FIG. 16 depicts an exemplary deployment review interface of an application deployment system in accordance with some embodiments of the present disclosure.

FIG. 16 depicts an exemplary deployment review interface 1600 of an application deployment system 604 in accordance with some embodiments of the present disclosure. Deployment review interface 1600 may be accessed by a selection of deployment confirmation interface (e.g., "REVIEW DEPLOYMENT INFO"). In an embodiment, application staging interface 1600 may include deployment interface tabs 1602, deployment timeline 1604, deployment navigation 1606, physical group deployment 1610, logical group deployment 1620, and deployment staging 1630. In an embodiment, each of deployment interface tabs 1602, deployment timeline 1604, and deployment navigation 1606 may function in the same manner as described herein with respect to application acquisition interface 1000.

Physical group deployment 1610 may provide an interface for DIQS administrator 612 to review and deploy the deployment packages (e.g., indexer deployment package 640 and search head deployment package 642) that are being deployed to the physical groups of the data intake and query system 606 (e.g., indexers 650 and search heads 652). In an embodiment, the deployment packages may be automatically assigned to the corresponding physical group as depicted at 1612 and 1614, while in other embodiments (not depicted), the DIQS administrator 612 may modify the assignment of deployment packages to physical groups. Physical group deployment 1610 may also allow the DIQS administrator 612 to view the contents of the deployment package and the physical groups.

Logical group deployment 1620 may provide an interface for DIQS administrator 612 to review and deploy the deployment packages (e.g., forwarder deployment packages $644_1$-$644_m$) that are being deployed to the logical groups of the data intake and query system 606 (e.g., forwarders $654_1$-$654_m$). In an embodiment, the deployment packages may be named and an interface may be provided to view the contents of the of each deployment package. Selection interfaces 1622 and 1624 may be provided for the DIQS administrator 612 to select between logical groups, as well as the ability to view information (e.g., configuration and hardware) about the logical group.

Deployment staging 1630 may allow DIQS administrator 612 to determine the timing of the deployment of the application deployment packages to the components of the data intake and query system 606. Although the deployment timing may be determined in any suitable manner, in an embodiment the application may be deployed immediately or at a time and date set by DIQS administrator 612 at staging interface 1632. Once the application staging has been completed, the user interface may continue to the next screen to confirm deployment, and then to the confirmation screen.

Figure 17:
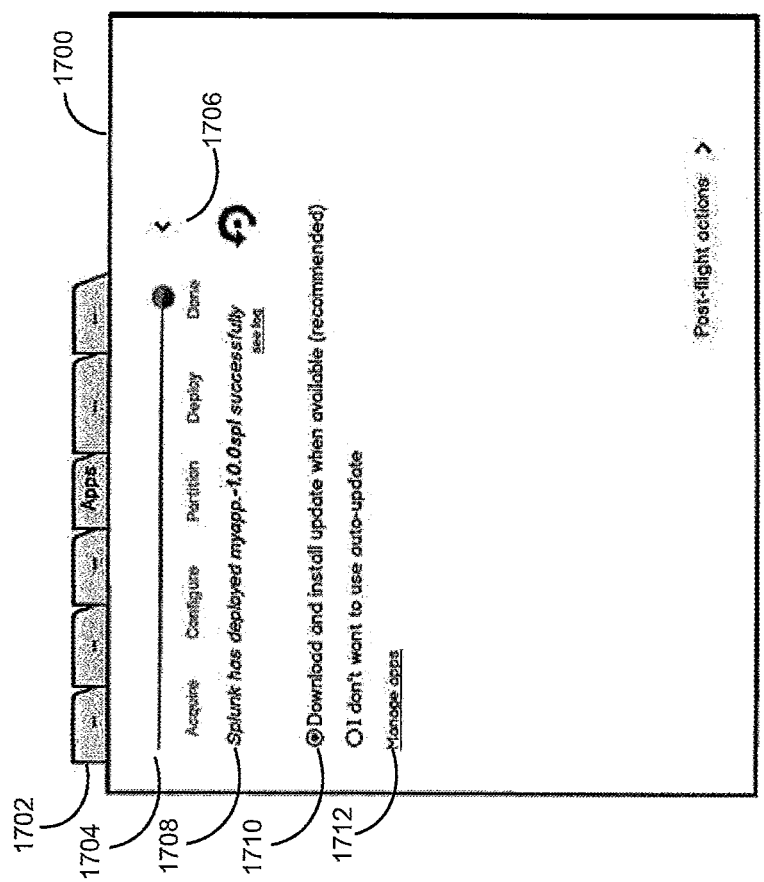
FIG. 17 depicts and exemplary deployment confirmation interface of an application deployment system in accordance with some embodiments of the present disclosure.

FIG. 17 depicts an exemplary deployment confirmation interface 1700 of an application deployment system 604 in accordance with some embodiments of the present disclosure. In an embodiment, deployment confirmation interface 1700 may include deployment interface tabs 1702, deployment timeline 1704, deployment navigation 1706, confirmation message 1708, update settings 1710, and application management 1712. In an embodiment, each of deployment interface tabs 1702, deployment timeline 1704, and deployment navigation 1706 may function in the same manner as described herein with respect to application acquisition interface 1000. Confirmation message 1708 may include a message regarding whether or not the deployment was successful, and an interface (e.g., "see log" selection) to view details about the application deployment. In an embodiment, update settings 1710 may allow DIQS administrator to select settings for deploying application updates (e.g., selecting auto-update versus manual update). Application management 1712 may allow DIQS administrator 612 to navigate to an application management tab to manage the newly deployed application as well as other installed applications for the data intake and query system. In an embodiment, application management 1712 may also allow DQIS administrator 1612 to uninstall an installed application, and revert to earlier installed application deployments.

3.4. Application Development and Deployment Methods

Figure 18:
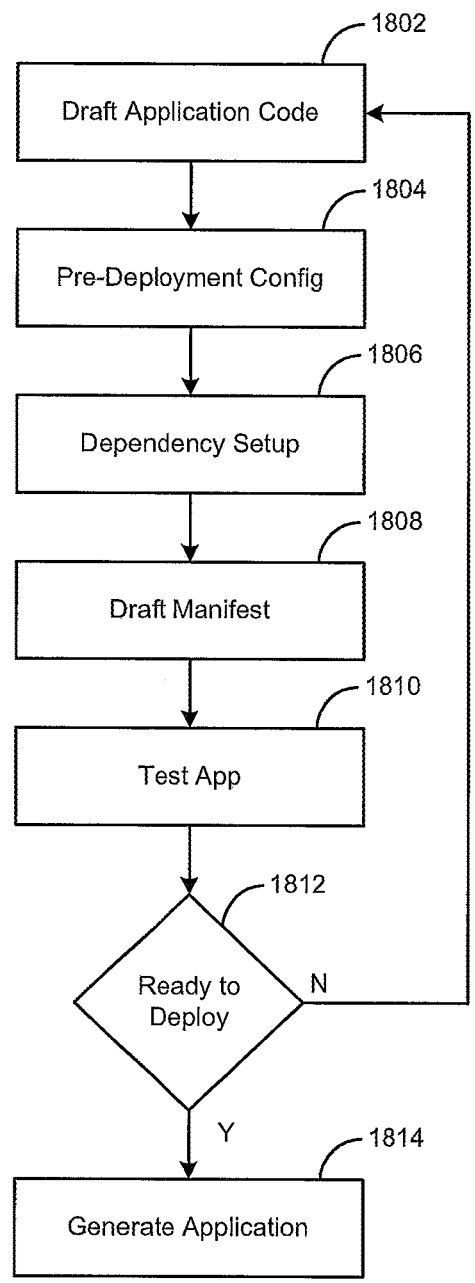
FIG. 18 depicts exemplary steps for creating an application for a data intake and query system in accordance with some embodiments of the present disclosure.
Figure 19:
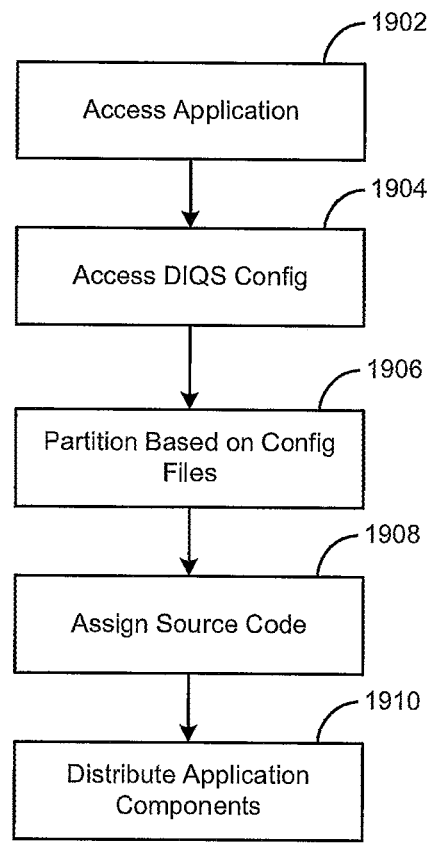
FIG. 19 depicts exemplary steps for partitioning an application for a data intake and query system in accordance with some embodiments of the present disclosure.
Figure 20:
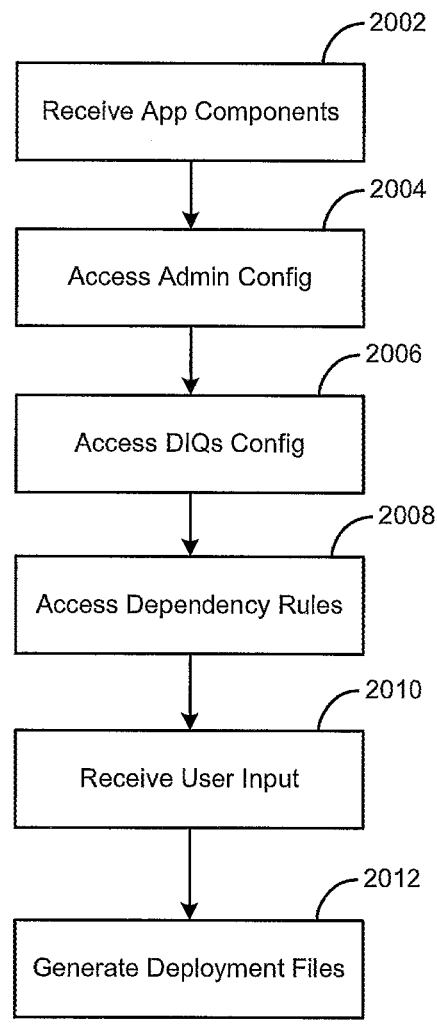
FIG. 20 depicts exemplary steps for deploying an application to a data intake and query system in accordance with some embodiments of the present disclosure.

FIGS. 18-20 depict exemplary steps for operating an application development and deployment system in accordance with some embodiments of the present disclosure. The steps depicted by FIGS. 18-20 are provided for illustrative purposes only; those skilled in the art will understand that additional steps may be included, that or more steps may be removed, and that the ordering of the steps of FIGS. 18-20 may be modified in any suitable manner. It will be understood that while particular hardware, software, system components, development techniques, partitioning methods, and deployment procedures may be described in the context of FIGS. 18-20, that the steps described herein are not so limited.

FIG. 18 depicts exemplary steps for creating an application for a data intake and query system in accordance with some embodiments of the present disclosure. Although the steps of FIG. 18 may be performed in any suitable manner using any suitable equipment, in an embodiment the steps of FIG. 18 may be performed by an application development environment 622 of an application development system 602, based on inputs provided by an application developer 610.

At step 1802, application code may be created, based on an application developer 610 interacting with a configuration file module 704, source code module 706, and application generator module 702 of application development environment 622. Based on those inputs, the application developer 610 may define settings for configuration files and draft source code that interfaces with the configuration files, as described herein. Once the application code has been created, processing may continue to step 1804.

At step 1804, pre-deployment configuration settings may be created and modified based on an application developer 610 interacting with pre-deployment configuration module 708 and application generator module 702 of application development environment 622. As described herein, the application developer 610 may define aspects of the configuration for certain components (e.g., logical groups). Once the pre-deployment configuration settings have been set, processing may continue to step 1806.

At step 1806, dependency definitions may be provided by an application developer 610 interacting with dependency management module 710 and application generator module 702 of application development environment 622. As described herein, the application developer 610 may define a variety of information about application dependencies (e.g., dependency names and version tolerances) for the application and its dependent applications. In an embodiment, the dependency definitions may be provided as a portion of the application manifest. Once the dependency definitions have been provided, processing may continue to step 1808.

At step 1808, an application manifest may be provided by an application developer 610 interacting with application manifest module 712 and application generator module 702 of application development environment 622. As described herein, the application developer 610 may provide information about an application (e.g., application name, version, and privacy policy) and logical groups (e.g., logical group name and inputs). Once the application manifest has been completed, processing may continue to step 1810.

At step 1810, the application may be tested by application generator module 702 of application development environment 622. Although the application may be tested in any suitable manner, in an embodiment the application generator module may run through a number of test routines for each of the configuration files, source code, pre-deployment configuration settings, dependency definitions, and application manifest. These tests may determine whether the application meets certain pre-defined criteria (e.g., that the settings provided by the source code have acceptable values and format for the configuration files, an initial confirmation that dependency version tolerances match, and a confirmation that the application manifest is in the proper format). In some embodiments, a test application package may be provided to application partitioner 624, which may test whether the application is capable of being partitioned. Once the application has been tested, processing may continue to step 1812, in which it may be determined whether the application has passed the required tests. If the application did not pass the required tests, one or more notifications regarding the errors may be provided to the application developer 610 and processing may return to step 1802. If the application passed the tests, processing may continue to step 1814.

At step 1814, application generator module 702 of application development environment 622 may generate the source application package 626 based on the source code, configuration files, pre-deployment configuration settings, dependency definitions, and application manifest, and transmit the source application package 626 to application partitioner 624, as described herein. The processing of FIG. 14 may then end.

FIG. 19 depicts exemplary steps for partitioning an application for a data intake and query system in accordance with some embodiments of the present disclosure. Although the steps of FIG. 19 may be performed in any suitable manner using any suitable equipment, in an embodiment the steps of FIG. 19 may be performed by an application partitioner 624 of an application development system 602, based on the source application package 626 from application development environment 622.

At step 1902, source application package 626 may be received from application development environment 622. The components of the received application package (e.g., source code, configuration files, pre-deployment configuration settings, dependency definitions, and the application manifest) may be identified by the application partitioning module 802 of application partitioner 624, and processing may continue to step 1904.

At step 1904, application partitioning module 802 of application partitioner 624 may access the DIQS configuration information from DIQS configuration module 806. As described herein, the DIQS configuration module 806 may determine and store information about data intake and query systems that may be utilized by the application partitioning module 802 to partition the source application package 626. Once the DIQS configuration information has been accessed, processing may continue to step 1906.

At step 1906, application partitioning module 802 of application partitioner 624 may partition the configuration files of the source application package 626. As described herein, the application partitioning module 802 and partitioning rules module 804 may associate each configuration file, or in some cases settings of certain configuration files, with physical groups and/or logical groups of the data intake and query system. Configuration files may be assigned to one or more of the indexer application package 630, search head application package 632, and forwarder group application packages $634_1$-$634_n$. Once the configuration files have been partitioned, processing may continue to step 1908.

At step 1908, application partitioning module 802 of application partitioner 624 may partition the source code of the source application package 626. As described herein, the application partitioning module 802 and partitioning rules module 804 may associate portions of source code with configuration files, based on the interactions between portions of the source code and configuration file and configuration file settings. Once each portion of source code is associated with one or more configuration files, the portion of source code may be assigned to one or more of the indexer application package 630, search head application package 632, and forwarder group application packages $634_1$-$634_n$, based on the assignments of the configuration files. Once the configuration files have been partitioned, processing may continue to step 1910.

At step 1910, application partitioning module 802 of application partitioner 624 may package each of the indexer application package 630, search head application package 632, and forwarder group application packages $634_1$-$634_n$ based on the DIQS configuration and partitioning rules, as described herein. Once the application has been partitioned and the application portions distributed to application deployment system 604, the processing of FIG. 19 may end.

FIG. 20 depicts exemplary steps for partitioning an application for a data intake and query system in accordance with some embodiments of the present disclosure. Although the steps of FIG. 20 may be performed in any suitable manner using any suitable equipment, in an embodiment the steps of FIG. 20 may be performed by an application deployment system 604, based on the received indexer application package 630, search head application package 632, and forwarder group application packages $634_1$-$634_n$ from application partitioner 624, and based on inputs from the DIQS administrator 612.

At step 2002, indexer application package 630, search head application package 632, and forwarder group application packages $634_1$-$634_n$ may be received from application partitioner 624. The received application packages may be identified by the application deployment module 902 of application deployment system 604, and processing may continue to step 2004.

At step 2004, application deployment module 902 of application deployment system 604 may access the administrator configuration settings from application configuration module 904. As described herein, the application configuration module 904 may include information such as predetermined configurations for an administrator, permissions, and saved work. Once the administrator configuration settings have been accessed, processing may continue to step 2006.

At step 2006, application deployment module 902 of application deployment system 604 may access the DIQS configuration settings from DIQS configuration module 906. As described herein, the DIQS configuration module 906 may include information relating to the components of the data intake and query system (e.g., indexers 650, search heads 652, and forwarder groups $654_1$-$654_m$) such as location, address, installed applications, dependencies, configuration parameters, physical group, and logical group. Once the DIQS configuration settings have been accessed, processing may continue to step 2008.

At step 2008, application deployment module 902 of application deployment system 604 may access dependency information from dependency rules module 908. As described herein, the dependency rules module 908 may include rules for determining how conflicts between dependent applications and dependencies should be resolved, and procedures for resolving those dependencies. Once the dependency information has been accessed, processing may continue to step 2010.

At step 2010, application deployment module 902 of application deployment system 604 may provide interfaces to receive inputs from DIQS administrator 612 in order to configure and deploy the application for the data intake and query system 606. As depicted and described herein, DIQS administrator 612 may select an application for deployment to the data intake and query system 606, provide configuration settings for the application, assign target deployment packages of the application to physical and logical groups, and stage the deployment of the deployment packages. Once the user input has been received at step 2008, processing may continue to step 2012.

At step 2012, application deployment module 902 of application deployment system 602 may package each of the indexer application package 630, search head application package 632, and forwarder group application packages $634_1$-$634_n$ for deployment based on the administrator configuration settings, dependency selections, DIQS configuration settings, and user inputs. As described herein, the packaging may result in the creation of indexer application package 640, search head application package 642, and forwarder group application packages $644_1$-$644_m$. These components may be respectively deployed to indexers 650, search heads 652, and forwarder groups $654_1$-$654_m$. Once the deployment packages have been distributed to data intake and query system 606, processing of the steps of FIG. 20 may end.

The foregoing provides illustrative examples of the present disclosure, which are not presented for purposes of limitation. It will be understood by a person having ordinary skill in the art that various modifications may be made by within the scope of the present disclosure. It will also be understood that the present disclosure need not take the specific form explicitly described herein, and the present disclosure is intended to include variations to and modifications thereof, consistent with the appended claims. It will also be understood that variations of the systems, apparatuses, and processes may be made to further optimize those systems, apparatuses, and processes. The disclosed subject matter is not limited to any single embodiment described herein, but rather should be construed in breadth and scope in accordance with the appended claims.

What is claimed is:

1. A computer-implemented method for generating target application packages for distinct computing devices of a data intake and query system, the method comprising:

receiving a source application package comprising a plurality of portions of code and a plurality of files, wherein at least a first file of the plurality of files and a first portion of code of the plurality of portions of code are associated with a first functionality performed by at least a first computing device of the data intake and query system, and wherein at least a second file of the plurality of files and a second portion of code of the plurality of portions of code are associated with a second functionality performed by at least a second computing device of the data intake and query system, wherein the second functionality is distinct from the first functionality and the at least a second computing device is distinct from the least a first computing device;

identifying the at least a first file from the plurality of files in the source application package;

identifying the at least a second file from the plurality of files in the source application package;

identifying the at least a first portion of code from the plurality of portions of code in the source application package;

identifying the at least a second portion of code from the plurality of portions of code in the source application package;

generating, using the source application package, a first target application package for a first group of computing devices of the data intake and query system, wherein the first target application package includes the at least a first file and the at least a first portion of code, and wherein the first group of computing devices are configured to perform the first functionality; and generating, using the source application package, a second target application package for a second group of computing devices of the data intake and query system, wherein the second target application package includes the at least a second file and the at least a second portion of code, and wherein the second group of computing devices are configured to perform the second functionality.

2. The method of claim 1, wherein the first functionality, corresponds to forwarding data from a first data source and the second functionality corresponds forwarding data from a second data source.

3. The method of claim 1, wherein the first functionality corresponds to a data indexing functionality and the second functionality corresponds to a data search functionality.

4. The method of claim 1, wherein the first functionality corresponds to a data indexing functionality and the second functionality corresponds to a data storage functionality.

5. The method of claim 1, further comprising:
communicating the first target application package to each computing device of the first group of computing devices, wherein each computing device of the first group of computing devices installs a first target application using the first target application package; and
communicating the second target application package to each computing device of the second group of computing devices, wherein each computing device of the second group of computing devices installs a second target application using the second target application package.

6. The method of claim 1, further comprising identifying one or more settings that are associated with the first file, wherein the first target application package includes the one or more settings.

7. The method of claim 1, wherein the first group of computing devices corresponds to one or more indexers configured to generate events and store the events in one or more buckets.

8. The method of claim 1, wherein the second group of computing devices corresponds to one or more search heads configured to receive and process one or more searches.

9. The method of claim 1, wherein the first group of computing devices corresponds to a first logical grouping of forwarders configured to forward data to one or more indexers and the second group of computing devices corresponds to a second logical grouping of forwarders configured to forward data to the one or more indexers.

10. The method of claim 1, wherein the plurality of files comprises a plurality of configuration files, and wherein the plurality of portions of code comprises source code.

11. The method of claim 1, wherein the at least a first portion of code comprises multiple portions of code.

12. The method of claim 1, wherein the at least a second portion of code comprises multiple portions of code.

13. The method of claim 1, wherein the at least a first portion of code comprises multiple first portions of code and the at least a second portion of code comprises multiple second portions of code, wherein some of the multiple first portions of code corresponds to some of the multiple second portions of code.

14. A system, comprising:
one or more processors configured to:
receive a source application package comprising a plurality of portions of code and a plurality of files, wherein at least a first file of the plurality of files and a first portion of code of the plurality of portions of code are associated with a first functionality performed by at least a first computing device of a data intake and query system, and wherein at least a second file of the plurality of files and a second portion of code of the plurality of portions of code are associated with a second functionality performed by at least a second computing device of the data intake and query system, wherein the second functionality is distinct from the first functionality and the at least a second computing device is distinct from the least a first computing device;
identify the at least a first file from the plurality of files in the source application package;
identify the at least a second file from the plurality of files in the source application package;
identify the at least a first portion of code from the plurality of portions of code in the source application package;
identify the at least a second portion of code from the plurality of portions of code in the source application package;
generate, using the source application package, a first target application package for a first group of computing devices of the data intake and query system, wherein the first target application package includes the at least a first file and the at least a first portion of code, and wherein the first group of computing devices are configured to perform the first functionality; and
generate generating, using the source application package, a second target application package for a second group of computing devices of the data intake and query system, wherein the second target application package includes the at least a second file and the at least a second portion of code, and wherein the second group of computing devices are configured to perform the second functionality.

15. The system of claim 14, wherein the first functionality corresponds to forwarding data from a first data source and the second functionality corresponds forwarding data from a second data source.

16. The system of claim 14, wherein the first functionality corresponds to a data indexing functionality and the second functionality corresponds to a data search functionality.

17. The system of claim 14, wherein the first functionality, corresponds to a data indexing functionality and the second functionality corresponds to a data storage functionality.

18. The system of claim 14, wherein the one or more processors are further configured to:
communicate the first target application package to each computing device of the first group of computing devices, wherein each computing device of the first group of computing devices installs a first target application using the first target application package; and
communicate the second target application package to each computing device of the second group of computing devices, wherein each computing device of the second group of computing devices installs a second target application using the second target application package.

19. The system of claim 14, wherein the one or more processors are further configured to identify one or more settings that are associated with the first file, wherein the first target application package includes the one or more settings.

20. The system of claim 14, wherein the first group of computing devices corresponds to one or more indexers configured to generate events and store the events in one or more buckets.

21. The system of claim 14, wherein the second group of computing devices corresponds to one or more search heads configured to receive and process one or more searches.

22. The system of claim 14, wherein the first group of computing devices corresponds to a first logical grouping of forwarders configured to forward data to one or more indexers and the second group of computing devices corresponds to a second logical grouping of forwarders configured to forward data to the one or more indexers, wherein the one or more indexers are configured to index and store data.

23. The system of claim 14, wherein the plurality of files comprises a plurality of configuration files, and wherein the plurality of portions of code comprises source code.

24. The system of claim 14, wherein the at least a first portion of code comprises multiple portions of code.

25. The system of claim 14, wherein the at least a second portion of code comprises multiple portions of code.

26. The system of claim 14, wherein the at least a first portion of code comprises multiple first portions of code and the at least a second portion of code comprises multiple second portions of code, wherein some of the multiple first portions of code corresponds to some of the multiple second portions of code.

27. Non-transitory computer-readable media comprising instructions stored thereon, which when executed by one or more processors, cause the one or more processors to perform operations comprising:
- receiving a source application package comprising a plurality of portions of code and a plurality of files, wherein at least a first file of the plurality of files and a first portion of code of the plurality of portions of code are associated with a first functionality, performed by at least a first computing device of a data intake and query system, and wherein at least a second file of the plurality of files and a second portion of code of the plurality of portions of code are associated with a second functionality performed by at least a second computing device of the data intake and query system, wherein the second functionality is distinct from the first functionality and the at least a second computing device is distinct from the least a first computing device;
- identifying the at least a first file from the plurality of files in the source application package;
- identifying the at least a second file from the plurality of files in the source application package;
- identifying the at least a first portion of code from the plurality of portions of code in the source application package;
- identifying the at least a second portion of code from the plurality of portions of code in the source application package;
- generating, using the source application package, a first target application package for a first group of computing devices of the data intake and query system, wherein the first target application package includes the at least a first file and the at least a first portion of code, and wherein the first group of computing devices are configured to perform the first functionality; and
- generating, using the source application package, a second target application package for a second group of computing devices of the data intake and query system, wherein the second target application package includes the at least a second file and the at least a second portion of code, and wherein the second group of computing devices are configured to perform the second functionality.

28. The non-transitory computer-readable media of claim 27, wherein the operations further comprise:
- communicating the first target application package to each computing device of the first group of computing devices, wherein each computing device of the first group of computing devices installs a first target application using the first target application package; and
- communicating the second target application package to each computing device of the second group of computing devices, wherein each computing device of the second group of computing devices installs a second target application using the second target application package.

29. The non-transitory computer-readable media of claim 27, wherein the operations further comprise identifying one or more settings that are associated with the first file, wherein the first target application package includes the one or more settings.

30. The non-transitory computer-readable media of claim 27, wherein the at least a first portion of code comprises multiple first portions of code and the at least a second portion of code comprises multiple second portions of code, wherein some of the multiple first portions of code corresponds to some of the multiple second portions of code.

* * * * *